(12) United States Patent
Marotta et al.

(10) Patent No.: US 11,989,788 B2
(45) Date of Patent: May 21, 2024

(54) SYSTEMS AND METHODS FOR LIGHT DETECTION AND RANGING (LIDAR) BASED GENERATION OF A HOMEOWNERS INSURANCE QUOTE

(71) Applicant: STATE FARM MUTUAL AUTOMOBILE INSURANCE COMPANY, Bloomington, IL (US)

(72) Inventors: Nicholas Carmelo Marotta, Scottsdale, AZ (US); Jd Johnson Willingham, Phoenix, AZ (US); Stacee Madsen, Mesa, AZ (US); Jared Wheet, Mesa, AZ (US); Laura A. Uphoff, Normal, IL (US); Paul Bates, Mesa, AZ (US); Austin Rowley, Mesa, AZ (US); Michael Scott Harrison, Chandler, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/142,641

(22) Filed: May 3, 2023

(65) Prior Publication Data
US 2023/0274367 A1     Aug. 31, 2023

Related U.S. Application Data

(63) Continuation of application No. 17/185,925, filed on Feb. 25, 2021, now Pat. No. 11,734,767.
(Continued)

(51) Int. Cl.
*G06Q 40/08* (2012.01)
*G01S 7/48* (2006.01)
(Continued)

(52) U.S. Cl.
CPC ............ *G06Q 40/08* (2013.01); *G01S 7/4802* (2013.01); *G01S 17/89* (2013.01); *G01S 17/894* (2020.01);
(Continued)

(58) Field of Classification Search
CPC ..... G06Q 40/08; G01S 17/894; G01S 17/809; G01S 7/4802; G06V 20/17; G06V 20/20; G06V 20/176
See application file for complete search history.

(56) References Cited

U.S. PATENT DOCUMENTS 7,389,255 B2   6/2008   Formisano
7,991,576 B2   8/2011   Roumeliotis
(Continued)

FOREIGN PATENT DOCUMENTS

CN   106683089 B   12/2019
CN   110160545 B   5/2020
(Continued)

OTHER PUBLICATIONS

Anon., "Ubamarketapp trial for Warner's Budgens," Grocer (The) 239.8269: 11. Williams Reed Ltd. (Aug. 20, 2016). (Year: 2016).
(Continued)

*Primary Examiner* — Scott C Anderson
(74) *Attorney, Agent, or Firm* — MARSHALL, GERSTEIN & BORUN LLP

(57) ABSTRACT

The following relates generally to light detection and ranging (LIDAR). In some embodiments, a homeowners insurance quote is produced based upon data received from a LIDAR camera. For instance, in some embodiments, a system: receives light detection and ranging (LIDAR) data generated from one or more LIDAR cameras; analyzes the LIDAR data to determine or identify one or more features or characteristics of a home; and generates an electronic home-
(Continued)

owners insurance quote based upon, at least in part, the one or more features or characteristics of the home determined or identified from the LIDAR data.

20 Claims, 14 Drawing Sheets

Related U.S. Application Data

(60) Provisional application No. 62/994,201, filed on Mar. 24, 2020, provisional application No. 62/991,461, filed on Mar. 18, 2020, provisional application No. 62/983,368, filed on Feb. 28, 2020.

(51) Int. Cl.
| | |
|---|---|
| *G01S 17/89* | (2020.01) |
| *G01S 17/894* | (2020.01) |
| *G05B 15/02* | (2006.01) |
| *G06Q 50/16* | (2012.01) |
| *G06V 20/10* | (2022.01) |
| *G06V 20/17* | (2022.01) |
| *G06V 20/20* | (2022.01) |
| *B64C 39/02* | (2023.01) |
| *B64U 101/30* | (2023.01) |
| *G06Q 10/087* | (2023.01) |
| *H04L 67/12* | (2022.01) |

(52) U.S. Cl.
CPC ............ *G05B 15/02* (2013.01); *G06Q 50/16* (2013.01); *G06V 20/17* (2022.01); *G06V 20/176* (2022.01); *G06V 20/20* (2022.01); *B64C 39/024* (2013.01); *B64U 2101/30* (2023.01); *G06Q 10/087* (2013.01); *H04L 67/12* (2013.01)

(56) References Cited

U.S. PATENT DOCUMENTS

| | | |
|---|---|---|
| 8,480,496 B2 | 7/2013 | Tomita |
| 8,490,006 B1 | 7/2013 | Reeser et al. |
| 8,527,306 B1 | 9/2013 | Reeser et al. |
| 8,533,144 B1 | 9/2013 | Reeser et al. |
| 8,640,038 B1 | 1/2014 | Reeser et al. |
| 8,665,084 B2 | 3/2014 | Shapiro et al. |
| 8,890,680 B2 | 11/2014 | Reeser et al. |
| 8,917,186 B1 | 12/2014 | Grant |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,064,161 B1 | 6/2015 | Boman et al. |
| 9,117,349 B2 | 8/2015 | Shapiro et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,262,909 B1 | 2/2016 | Grant |
| 9,286,772 B2 | 3/2016 | Shapiro et al. |
| 9,344,330 B2 | 5/2016 | Jacob et al. |
| 9,424,737 B2 | 8/2016 | Bailey et al. |
| 9,443,195 B2 | 9/2016 | Micali et al. |
| 9,472,092 B1 | 10/2016 | Grant |
| 9,589,441 B2 | 3/2017 | Shapiro et al. |
| 9,609,003 B1 | 3/2017 | Chmielewski et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,739,813 B2 | 8/2017 | Houlette et al. |
| 9,770,382 B1 | 9/2017 | Ellis |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,811,862 B1 | 11/2017 | Allen et al. |
| 9,812,001 B1 | 11/2017 | Grant |
| 9,888,371 B1 | 2/2018 | Jacob |
| 9,892,463 B1 | 2/2018 | Hakimi-Boushehri et al. |
| 9,898,168 B2 | 2/2018 | Shapiro et al. |
| 9,898,912 B1 | 2/2018 | Jordan et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,202 B1 | 4/2018 | Moon et al. |
| 9,978,033 B1 | 5/2018 | Payne et al. |
| 9,997,056 B2 | 6/2018 | Bleisch |
| 10,002,295 B1 | 6/2018 | Cardona et al. |
| 10,042,341 B1 | 8/2018 | Jacob |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,102,586 B1 | 10/2018 | Marlow et al. |
| 10,102,589 B1 | 10/2018 | Tofte et al. |
| 10,107,708 B1 | 10/2018 | Schick et al. |
| 10,137,942 B2 | 11/2018 | Sanders et al. |
| 10,137,984 B1 | 11/2018 | Flick |
| 10,142,394 B2 | 11/2018 | Chmielewski et al. |
| 10,176,514 B1 | 1/2019 | Chen et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,198,771 B1 | 2/2019 | Madigan et al. |
| 10,210,577 B1 | 2/2019 | Davis et al. |
| 10,217,068 B1 | 2/2019 | Davis et al. |
| 10,229,394 B1 | 3/2019 | Davis et al. |
| 10,244,294 B1 | 3/2019 | Moon et al. |
| 10,249,158 B1 | 4/2019 | Jordan, II et al. |
| 10,282,787 B1 | 5/2019 | Hakimi-Boushehri et al. |
| 10,282,788 B1 | 5/2019 | Jordan et al. |
| 10,282,961 B1 | 5/2019 | Jordan, II et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,304,313 B1 | 5/2019 | Moon et al. |
| 10,311,302 B2 | 6/2019 | Kottenstette et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,366,288 B1 | 7/2019 | Kottenstette et al. |
| 10,387,966 B1 | 8/2019 | Shah et al. |
| 10,388,135 B1 | 8/2019 | Jordan et al. |
| 10,409,855 B2 | 9/2019 | Petrou et al. |
| 10,412,169 B1 | 9/2019 | Madey et al. |
| 10,446,000 B2 | 10/2019 | Friar et al. |
| 10,467,476 B1 | 11/2019 | Cardona et al. |
| 10,469,282 B1 | 11/2019 | Konrardy et al. |
| 10,480,825 B1 | 11/2019 | Riblet et al. |
| 10,482,746 B1 | 11/2019 | Moon et al. |
| 10,506,411 B1 | 12/2019 | Jacob |
| 10,514,669 B1 | 12/2019 | Call et al. |
| 10,515,372 B1 | 12/2019 | Jordan, II et al. |
| 10,515,419 B1 | 12/2019 | Walker et al. |
| 10,521,865 B1 | 12/2019 | Spader et al. |
| 10,522,009 B1 | 12/2019 | Jordan, II et al. |
| 10,527,423 B1 | 1/2020 | Pavlyuk et al. |
| 10,528,996 B2 | 1/2020 | Clark et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,565,550 B1 | 2/2020 | Gowda |
| 10,573,146 B1 | 2/2020 | Jordan, II et al. |
| 10,573,149 B1 | 2/2020 | Jordan, II et al. |
| 10,579,028 B1 | 3/2020 | Jacob |
| 10,586,177 B1 | 3/2020 | Choueiter et al. |

(56) References Cited

U.S. PATENT DOCUMENTS

| | | |
|---|---|---|
| 10,607,295 B1 | 3/2020 | Hakimi-Boushehri et al. |
| 10,634,576 B1 | 4/2020 | Schick et al. |
| 10,643,072 B2 | 5/2020 | Kottenstette et al. |
| 10,664,922 B1 | 5/2020 | Madigan et al. |
| 10,679,292 B1 | 6/2020 | Call et al. |
| 10,685,402 B1 | 6/2020 | Bryant et al. |
| 10,699,346 B1 | 6/2020 | Corder et al. |
| 10,699,348 B1 | 6/2020 | Devereaux et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan, II et al. |
| 10,750,252 B2 | 8/2020 | Petri et al. |
| 10,795,329 B1 | 10/2020 | Jordan et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,816,939 B1 | 10/2020 | Coleman |
| 10,818,105 B1 | 10/2020 | Konrardy et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,832,267 B2 | 11/2020 | Poole |
| 10,846,800 B1 | 11/2020 | Bryant et al. |
| 10,907,844 B2 | 2/2021 | Ribbich et al. |
| 10,922,756 B1 | 2/2021 | Call et al. |
| 10,922,948 B1 | 2/2021 | Moon et al. |
| 10,943,447 B1 | 3/2021 | Jordan, II et al. |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan, II et al. |
| 11,015,997 B1 | 5/2021 | Schick et al. |
| 11,017,480 B2 | 5/2021 | Shah et al. |
| 11,024,079 B1 | 6/2021 | Chuah et al. |
| 11,042,137 B1 | 6/2021 | Call et al. |
| 11,042,942 B1 | 6/2021 | Hakimi-Boushehri et al. |
| 11,043,026 B1 | 6/2021 | Fathi et al. |
| 11,043,098 B1 | 6/2021 | Jordan, II et al. |
| 11,046,430 B1 | 6/2021 | Melton et al. |
| 11,049,078 B1 | 6/2021 | Jordan et al. |
| 11,049,189 B2 | 6/2021 | Shah et al. |
| 11,069,352 B1 | 7/2021 | Tang et al. |
| 11,074,659 B1 | 7/2021 | Hakimi-Boushehri et al. |
| 11,100,594 B1 | 8/2021 | West et al. |
| 11,118,812 B1 | 9/2021 | Riblet et al. |
| 11,126,708 B2 | 9/2021 | Reimer |
| 11,151,378 B2 | 10/2021 | Kottenstette et al. |
| 11,164,257 B1 | 11/2021 | Devereaux et al. |
| 11,164,391 B1 | 11/2021 | Sharma et al. |
| 11,195,324 B1 | 12/2021 | Dubost et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,250,515 B1 | 2/2022 | Feiteira et al. |
| 11,277,465 B2 | 3/2022 | Chmielewski et al. |
| 11,300,662 B1 | 4/2022 | Milton |
| 11,348,193 B1 | 5/2022 | Konrardy et al. |
| 11,354,728 B2 | 6/2022 | Chachek et al. |
| 11,367,265 B2 | 6/2022 | Vianello et al. |
| 11,417,212 B1 | 8/2022 | Farooqui et al. |
| 11,453,129 B2 | 9/2022 | Paepcke et al. |
| 2001/0033284 A1 | 10/2001 | Chan |
| 2002/0060784 A1 | 5/2002 | Pack et al. |
| 2003/0212818 A1 | 11/2003 | Klein et al. |
| 2007/0150406 A1 | 6/2007 | Subramanian et al. |
| 2007/0269102 A1 | 11/2007 | Wang |
| 2009/0110267 A1 | 4/2009 | Zakhor et al. |
| 2009/0265193 A1 | 10/2009 | Collins et al. |
| 2009/0310867 A1 | 12/2009 | Matei et al. |
| 2009/0322742 A1 | 12/2009 | Muktinutalapati et al. |
| 2010/0131533 A1 | 5/2010 | Ortiz |
| 2010/0150431 A1 | 6/2010 | Chen et al. |
| 2011/0161117 A1 | 6/2011 | Busque et al. |
| 2011/0276417 A1 | 11/2011 | Campbell et al. |
| 2012/0022896 A1 | 1/2012 | Jayaram et al. |
| 2012/0176497 A1 | 7/2012 | Shadmi |
| 2012/0299961 A1 | 11/2012 | Ramkumar et al. |
| 2013/0083964 A1 | 4/2013 | Morris et al. |
| 2013/0141549 A1 | 6/2013 | Beers et al. |
| 2013/0179841 A1 | 7/2013 | Mutton et al. |
| 2013/0215116 A1 | 8/2013 | Siddique et al. |
| 2013/0300740 A1 | 11/2013 | Snyder et al. |
| 2014/0032596 A1 | 1/2014 | Fish et al. |
| 2014/0081599 A1 | 3/2014 | Bradley |
| 2014/0107927 A1 | 4/2014 | Rojas |
| 2014/0125671 A1 | 5/2014 | Vorobyov et al. |
| 2014/0266669 A1 | 9/2014 | Fadell et al. |
| 2014/0304011 A1 | 10/2014 | Yager et al. |
| 2014/0306993 A1 | 10/2014 | Poulos et al. |
| 2015/0061859 A1 | 3/2015 | Matsuoka et al. |
| 2015/0172628 A1 | 6/2015 | Brown et al. |
| 2015/0227644 A1 | 8/2015 | Schultz |
| 2015/0227893 A1 | 8/2015 | Huynh et al. |
| 2015/0269438 A1 | 9/2015 | Samarasekera et al. |
| 2015/0286893 A1 | 10/2015 | Straub et al. |
| 2015/0302116 A1 | 10/2015 | Howell |
| 2015/0347910 A1 | 12/2015 | Fadell et al. |
| 2015/0379371 A1 | 12/2015 | Yoon et al. |
| 2016/0023761 A1 | 1/2016 | McNally |
| 2016/0148433 A1 | 5/2016 | Petrovskaya et al. |
| 2016/0196689 A1 | 6/2016 | Pullan |
| 2016/0260158 A1 | 9/2016 | High et al. |
| 2017/0039307 A1 | 2/2017 | Koger et al. |
| 2017/0097413 A1 | 4/2017 | Gillian et al. |
| 2017/0116781 A1 | 4/2017 | Babahajiani et al. |
| 2017/0132567 A1 | 5/2017 | Glunz |
| 2017/0206426 A1 | 7/2017 | Schrier et al. |
| 2017/0220887 A1 | 8/2017 | Fathi et al. |
| 2017/0243064 A1 | 8/2017 | Simari et al. |
| 2017/0264890 A1 | 9/2017 | Gorilovsky et al. |
| 2017/0293894 A1 | 10/2017 | Taliwal et al. |
| 2017/0365008 A1 | 12/2017 | Schreier et al. |
| 2017/0365094 A1 | 12/2017 | Liu et al. |
| 2018/0075648 A1 | 3/2018 | Moghadam et al. |
| 2018/0096373 A1 | 4/2018 | Poole |
| 2018/0101813 A1 | 4/2018 | Paat et al. |
| 2018/0121576 A1 | 5/2018 | Mosher et al. |
| 2018/0143756 A1 | 5/2018 | Mildrew et al. |
| 2018/0144547 A1 | 5/2018 | Shakib et al. |
| 2018/0181789 A1 | 6/2018 | Metzler et al. |
| 2018/0211441 A1 | 7/2018 | Priest et al. |
| 2018/0225504 A1 | 8/2018 | Sargent et al. |
| 2018/0273030 A1 | 9/2018 | Weldon et al. |
| 2018/0350145 A1 | 12/2018 | Byl et al. |
| 2018/0358009 A1 | 12/2018 | Daley et al. |
| 2018/0364045 A1 | 12/2018 | Williams et al. |
| 2019/0012726 A1* | 1/2019 | D'Agostino ........ G06F 21/6245 |
| 2019/0025858 A1 | 1/2019 | Bar-Nahum et al. |
| 2019/0026570 A1 | 1/2019 | Wei et al. |
| 2019/0026958 A1 | 1/2019 | Gausebeck et al. |
| 2019/0051054 A1 | 2/2019 | Jovanovic et al. |
| 2019/0057169 A1 | 2/2019 | Santarone et al. |
| 2019/0096135 A1 | 3/2019 | Dal Mutto et al. |
| 2019/0128771 A1 | 5/2019 | Santarone et al. |
| 2019/0155973 A1 | 5/2019 | Morczinek et al. |
| 2019/0188755 A1 | 6/2019 | Fuzell-Casey et al. |
| 2019/0188796 A1 | 6/2019 | Sauer et al. |
| 2019/0189007 A1 | 6/2019 | Herman et al. |
| 2019/0217477 A1 | 7/2019 | Paepcke et al. |
| 2019/0234742 A1 | 8/2019 | Jachym et al. |
| 2019/0236531 A1 | 8/2019 | Adato et al. |
| 2019/0251520 A1 | 8/2019 | Bentley, III et al. |
| 2019/0277703 A1 | 9/2019 | Valouch et al. |
| 2019/0295319 A1 | 9/2019 | Pham et al. |
| 2019/0303850 A1 | 10/2019 | Mangos et al. |
| 2019/0311319 A1 | 10/2019 | Cote et al. |
| 2019/0346271 A1 | 11/2019 | Zhang et al. |

(56) References Cited

U.S. PATENT DOCUMENTS

| | | |
|---|---|---|
| 2019/0362431 A1 | 11/2019 | Hertz et al. |
| 2019/0366558 A1 | 12/2019 | Gupta et al. |
| 2019/0392087 A1 | 12/2019 | Suard et al. |
| 2020/0043368 A1 | 2/2020 | Brathwaite et al. |
| 2020/0079488 A1 | 3/2020 | Messori et al. |
| 2020/0082612 A1 | 3/2020 | Frederick et al. |
| 2020/0124731 A1 | 4/2020 | Xiong et al. |
| 2020/0129862 A1 | 4/2020 | Liu et al. |
| 2020/0132470 A1 | 4/2020 | Xu et al. |
| 2020/0134734 A1* | 4/2020 | Aneesh .................. G06Q 10/10 |
| 2020/0151504 A1 | 5/2020 | Albrecht et al. |
| 2020/0167631 A1 | 5/2020 | Rezgui |
| 2020/0182634 A1 | 6/2020 | Karceski |
| 2020/0184706 A1 | 6/2020 | Speasl et al. |
| 2020/0219264 A1 | 7/2020 | Brunner et al. |
| 2020/0285206 A1 | 9/2020 | Young et al. |
| 2020/0293796 A1* | 9/2020 | Sajjadi Mohammadabadi ............ G06V 10/751 |
| 2020/0301378 A1 | 9/2020 | McQueen et al. |
| 2020/0301799 A1 | 9/2020 | Manivasagam et al. |
| 2020/0302510 A1 | 9/2020 | Chachek et al. |
| 2020/0302549 A1 | 9/2020 | Jordan et al. |
| 2020/0302681 A1 | 9/2020 | Totty et al. |
| 2020/0309557 A1 | 10/2020 | Efland |
| 2020/0327791 A1 | 10/2020 | Moon et al. |
| 2020/0357132 A1 | 11/2020 | Jovanovic et al. |
| 2020/0370994 A1 | 11/2020 | Santarone et al. |
| 2021/0035432 A1 | 2/2021 | Moon et al. |
| 2021/0035455 A1 | 2/2021 | Hall et al. |
| 2021/0041246 A1 | 2/2021 | Kukreja |
| 2021/0042843 A1 | 2/2021 | Bryant et al. |
| 2021/0049542 A1 | 2/2021 | Dalal et al. |
| 2021/0097776 A1 | 4/2021 | Faulkner et al. |
| 2021/0112647 A1 | 4/2021 | Zane |
| 2021/0142564 A1 | 5/2021 | Impas et al. |
| 2021/0158671 A1 | 5/2021 | Jordan, II et al. |
| 2021/0224589 A1 | 7/2021 | Jahagirdar et al. |
| 2021/0264524 A1 | 8/2021 | Knarr et al. |
| 2021/0279811 A1 | 9/2021 | Waltman et al. |
| 2021/0279950 A1 | 9/2021 | Phalak |
| 2021/0312789 A1 | 10/2021 | Linn |
| 2021/0373569 A1 | 12/2021 | Tazume |
| 2022/0101275 A1 | 3/2022 | Aspro et al. |
| 2023/0281527 A1 | 9/2023 | Cella et al. |

FOREIGN PATENT DOCUMENTS

| | | |
|---|---|---|
| CN | 111626536 A | 9/2020 |
| CN | 113138558 A | 7/2021 |
| JP | 2003-157357 A | 5/2003 |
| KR | 10-2015-0129845 A | 11/2015 |
| KR | 10-2038097 B1 | 10/2019 |
| WO | 2014/159131 A2 | 10/2014 |
| WO | 2016/081511 A2 | 5/2016 |
| WO | 2017/201486 A1 | 11/2017 |
| WO | 2017/217936 A1 | 12/2017 |
| WO | 2021/087185 A1 | 5/2021 |

OTHER PUBLICATIONS

Apolloauto, apollo_2_0_hardware_system_installation_guide_v1.md, updated on Jan. 17, 2019.

Arief, H.A., et al., "Land Cover Segmentation of Airborne LiDAR Data Using Stochastic Atrous Network," Remote Sensing 10.6 MDPI AG. (Jun. 2018), (Year: 2018).

Covelli, "The Camera-Lidar Debate", Jul. 29, 2019 (Year: 2019).

Leskens et al., An interactive simulation and visualization tool for flood analysis usable for practitioners, Mitig. Adapt Strateg. Glob. Chang., 22:307-324 (2015).

LiDAR Camera L515—Intel (Registered) RealSense (Trademark) Depth and Tracking Cameras, Available Online at <https://web.archive.org./web/20200220130643/https://www.intelrealsense.com/lidar-camera-l515/> 1-17 (2020).

Liu et al., Precision study on augmented reality-based visual guidance for facility management tasks, Automation in Construction, 90: 79-90. (2018).

Ridden, "Intel adds palm-sized LiDAR to RealSense Range," New Atlas, downloaded from the Internet at: <https://newatlas.com/digital-cameras/intel-realsense-1515-lidar/>, Dec. 12, 2019 (Year: 2019).

Rubinstein, E., "EFR confab: Operators put principles and the 'Net' into action," Nation's Restaurant News 33.17: 4,83. Lebhar-Friedman, Inc. (Aril 26, 199). (Year: 1999).

Schall et al., "VIDENTE-3D visualization of underground infrastructure using handheld augmented reality." Geohydroinformatics: integrating GIS and water engineering (2010): 207-219 (Year: 2010).

Schall et al., Smart Vidente: advances in mobile augmented reality for interactive visualization of underground infrastructure, Personal and Ubiquitous Computing, 17: 1533-1549 (2013).

Soria et al., Augmented and virtual reality for underground facilities management, Journal of Computing and Information Science in Engineering, 18.4 (2018).

Tran et al., Procedural Reconstruction of 3D Indoor Models from Lidar Data Using Reversible Jump Markov Chain Monte Carlo, 2020 (Year: 2020).

U.S. Appl. No. 17/185,858, Marotta et al., "Systems and Methods for Light Detection and Ranging (LIDAR) Based Generation of a Personal Articles Insurance Quote"., U.S. Appl. No. 17/185,858.

U.S. Appl. No. 17/185,896, Marotta et al., "Systems and Methods for Light Detection and Ranging (LIDAR) Based Generation of an Inventory List of Personal Belongings"., U.S. Appl. No. 17/185,896.

U.S. Appl. No. 17/185,925, Marotta et al., "Systems And Methods For Light Detection And Ranging (Lidar) Based Generation Of A Homeowners Insurance Quote"., U.S. Appl. No. 17/185,925.

U.S. Appl. No. 17/185,930, "Systems And Methods For Light Detection And Ranging (Lidar) Based Generation Of An Insurance Claim"., U.S. Appl. No. 17/185,930.

U.S. Appl. No. 17/185,938, "Systems And Methods For Light Detection And Ranging (Lidar) Based Generation Of First Notice Of Loss"., U.S. Appl. No. 17/185,938.

U.S. Appl. No. 17/185,955, "Systems And Methods For Light Detection And Ranging (Lidar) Based Generation Of Navigation For Vision-Impaired Individuals"., U.S. Appl. No. 17/185,955.

U.S. Appl. No. 17/240,970, filed Apr. 26, 2021, Marotta et al., "Systems And Methods For A 3d Home Model For Visualizing Proposed Changes To Home".

U.S. Appl. No. 17/240,985, filed Apr. 26, 2021, "Systems And Methods For A 3d Home Model For Representation Of Property".

U.S. Appl. No. 17/240,993, filed Apr. 26, 2021, Marotta et al., "Systems And Methods For A 3d Model For Viewing Potential Placement Of An Object".

U.S. Appl. No. 17/240,999, filed Apr. 26, 2021, "Systems And Methods For Ai Based Recommendations For Object Placement In A Home".

U.S. Appl. No. 17/241,008, filed Apr. 26, 2021, Marotta et al., "Systems And Methods For A 3d Model For Visualization Of Landscape Design".

U.S. Appl. No. 17/241,013, filed Apr. 26, 2021, Marotta et al., "Systems And Methods For Visualization Of Utility Lines".

U.S. Appl. No. 17/241,019, filed Apr. 26, 2021, Marotta et al., "Systems And Methods For Commercial Inventory Mapping".

U.S. Appl. No. 17/241,025, filed Apr. 26, 2021, "Systems And Methods For Commercial Inventory Mapping Including A Lidar-Based Virtual Map".

U.S. Appl. No. 17/241,036, filed Apr. 26, 2021, Marotta et al., "Systems And Methods For Commercial Inventory Mapping Including Determining If Goods Are Still Available".

U.S. Appl. No. 17/241,043, filed Apr. 26, 2021, Marotta et al., "Systems And Methods For 3d Generation Of A Floor Plan For A Commercial Building".

U.S. Appl. No. 17/241,053, filed Apr. 26, 2021, Marotta et al., "Systems And Methods For 3d Navigation Of An Interior Of A Building".

U.S. Appl. No. 62/888,771 Specification, filed Aug. 19, 2019. (Year: 2019).

(56) References Cited

OTHER PUBLICATIONS

Zhou et al., Seamless Fusion of LiDAR and Aerial Imagery for Building Extraction, IEEE Transactions on Geoscience and Remote Sensing, 52(11):7393-7407 (2014).

Article, "Hyundai MnSoft Inc Submits Korean Patent Application for Method of Automatic Generation of Indoor Map Utilizing the LiDAR Equipment"; ZGlobal IP News. Measurement & Testing Patent News [New Delhi] May 11, 2014 (Year: 2014).

Nagy, D., Lau, D., Locke, J., Stoddart, J., Villaggi, L., Wang, R & Benjamin, D. (May 2017). Project discover: An application of generative design for architectural space planning. In Proceedings of the Symposium on Simulation for Architecture and Urban Design (pp. 1-8). (Year: 2017).

Rahbar, M., Mahdavinejad, M., Bemanian, M., Davaie Markazi, A. H., & Hovestadt, L. (2019). Generating synthetic space allocation probability layouts based on trained conditional-GANs. Applied Artificial Intelligence, 33(8), 689-705. (Year: 2019).

Villaggi, L., & Nagy, D. (2019). Generative Design for Architectural Space Planning: The Case of the Autodesk University 2017 Layout. (Year: 2017).

\* cited by examiner

SYSTEMS AND METHODS FOR LIGHT DETECTION AND RANGING (LIDAR) BASED GENERATION OF A HOMEOWNERS INSURANCE QUOTE

CROSS-REFERENCE TO RELATED APPLICATIONS

This application claims priority to U.S. application Ser. No. 17/185,925 (filed Feb. 25, 2021) and entitled "SYSTEMS AND METHODS FOR LIGHT DETECTION AND RANGING (LIDAR) BASED GENERATION OF A HOMEOWNERS INSURANCE QUOTE," which claims the benefit of U.S. Provisional Application No. 62/983,368 (filed Feb. 28, 2020) entitled "SYSTEMS AND METHODS FOR LIGHT DETECTION AND RANGING (LIDAR);" U.S. Provisional Application No. 62/991,461 (filed Mar. 18, 2020) entitled "SYSTEMS AND METHODS FOR LIGHT DETECTION AND RANGING (LIDAR);" and U.S. Provisional Application No. 62/994,201 (filed Mar. 24, 2020) entitled "SYSTEMS AND METHODS FOR LIGHT DETECTION AND RANGING (LIDAR)," the entirety of each of which is incorporated by reference herein.

FIELD

The present disclosure generally relates to light detection and ranging (LIDAR) technology, and more specifically to applications of LIDAR technology to insurance policies and applications of LIDAR technology to assist an impaired individual.

BACKGROUND

LIDAR is a technology that measures distance to a target by illuminating the target (e.g., using laser light) and then measuring the reflected light with a sensor (e.g., measuring the time of flight from the laser signal source to its return to the sensor). Digital 3D representations of the target may then be made using differences in laser return times and wavelengths. LIDAR may be used to measure distances (e.g., the distance from a LIDAR camera to an object, the distance between objects, and so forth).

SUMMARY

The present embodiments may be related to LIDAR technology, including applications of LIDAR technology to insurance policies and applications of LIDAR technology to assist an impaired individual. The LIDAR technology may be used to produce an insurance quote or insurance claim. The LIDAR technology may also be used to provide navigation directions to assist an impaired individual.

In accordance with the described embodiments, the disclosure herein generally addresses, inter alia, systems and methods for applying LIDAR technology to insurance quote generation (e.g., a quote for home insurance). A server may receive preexisting architecture data, create baseline architecture data using the preexisting architecture data, receive LIDAR data generated from a LIDAR camera, combine the baseline architecture data with the LIDAR data to create an architecture profile, and generate an insurance quote based upon the architecture profile. According to some aspects, the LIDAR data comprises a 3D point cloud, and may include information of both an interior and an exterior of a house. The server may also receive information from other sources, such as drones.

In one aspect, a computer-implemented method for generating an insurance quote may be provided. The computer-implemented method may include, via one or more local or remote processors, transceivers, sensors, and/or servers, (1) receiving preexisting architecture data; (2) creating baseline architecture data using the preexisting architecture data; (3) receiving LIDAR data generated from a LIDAR camera; (4) combining the baseline architecture data with the LIDAR data to create an architecture profile; and/or (5) generating an insurance quote based upon the architecture profile. The method may include additional, less, or alternate actions, including that discussed elsewhere herein.

In another aspect, an electronic device for generating an insurance quote may be provided. The electronic device may be configured to, via one or more processors, transceivers, and/or sensors, (1) receive preexisting architecture data; (2) create baseline architecture data using the preexisting architecture data; (3) receive LIDAR data generated from a LIDAR camera; (4) combine the baseline architecture data with the LIDAR data to create an architecture profile; and/or (5) generate an insurance quote based upon the architecture profile. The electronic device may include additional, less, or alternate functionality, including that discussed elsewhere herein.

In yet another aspect, a computer system for generating an insurance quote may be provided. The system may include a LIDAR camera, a memory configured to store non-transitory computer executable instructions and configured to interface with a processor and/or associated transceiver. The processor may be configured to execute the non-transitory computer executable instructions to cause the processor and/or associated transceiver to (1) receive preexisting architecture data; (2) create baseline architecture data using the preexisting architecture data; (3) receive LIDAR data generated from a LIDAR camera; (4) combine the baseline architecture data with the LIDAR data to create an architecture profile; and/or (5) generate an insurance quote based upon the architecture profile. The system may include additional, less, or alternate functionality, including that discussed elsewhere herein.

In accordance with the described embodiments, the disclosure herein generally addresses, inter alia, systems and methods for applying LIDAR technology to generate an inventory list of personal belongings. A server may (1) receive light detection and ranging (LIDAR) data generated from one or more LIDAR cameras; (2) analyze the LIDAR data to determine or identify one or more personal articles or insurable assets; and/or (3) generate an electronic inventory list of personal belongings based upon the one or more personal articles or insurable assets determined or identified from the LIDAR data.

In accordance with the described embodiments, the disclosure herein generally addresses, inter alia, systems and methods for applying LIDAR technology to generate a homeowner's insurance quote. A server may (1) receive light detection and ranging (LIDAR) data generated from one or more LIDAR cameras; (2) analyze the LIDAR data to determine or identify one or more features or characteristics of a home; and/or (3) generate an electronic homeowners insurance quote based upon, at least in part, the one or more features or characteristics of the home determined or identified from the LIDAR data.

Further in accordance with the described embodiments, the disclosure herein generally addresses, inter alia, systems and methods for applying LIDAR technology to insurance claim generation (e.g., providing first notice of loss, or first notice of an insurance claim). A server may (1) receive LIDAR data generated from a LIDAR camera; (2) determine if an event has occurred based upon the received LIDAR data; and/or (3) if the event has occurred, generate and provide an electronic or virtual first notice of loss (or otherwise first notice of an insurance claim or potential insurance claim). The server may also receive information from other sources, such as drones, smart vehicles, smart homes, vehicle sensors, home-mounted sensors, smart infrastructure, mobile devices, mobile device sensors, and smart devices.

In another aspect, a computer-implemented method for generating an electronic first notice of loss may be provided. The method may include, via one or more local or remote processors, transceivers, sensors, and/or servers, (1) receiving LIDAR data generated from a LIDAR camera; (2) determining that an event has occurred based upon the received LIDAR data; and/or (3) in response to the determination that the event has occurred, generating and providing an electronic first notice of loss. The first notice of loss may be provided to an insurance provider's and/or an insured's computing device. For instance, an electronic first notice of loss may be transmitted to an insurance provider server or an insured's mobile device, and then displayed for review and further action, such as completing, preparing, and/or handling an insurance claim. The method may include additional, less, or alternate functionality, including that discussed elsewhere herein.

In yet another aspect, an electronic device for generating an electronic first notice of loss may be provided. The electronic device may be configured to receive LIDAR data generated from a LIDAR camera, determine if an event has occurred based upon the received LIDAR data, and if the event has occurred, generate, provide, and/or display an electronic first notice of loss.

In yet another aspect, a computer system for generating an electronic (or virtual) first notice of loss may be provided. The system may include a LIDAR camera, a memory configured to store non-transitory computer executable instructions and configured to interface with a processor. The processor may be configured to execute the non-transitory computer executable instructions to cause the processor and/or an associated transceiver to (1) receive LIDAR data generated from the LIDAR camera; (2) determine if an event has occurred based upon the received LIDAR data; and (3) if the event has occurred, generate and provide an electronic first notice of loss. The first notice of loss may be provided to an insurance provider's and/or an insured's computing device. For instance, an electronic first notice of loss may be transmitted to an insurance provider server or an insured's mobile device, and then displayed for review and further action, such as completing, preparing, or handling an insurance claim. The computer system may include additional, less, or alternate functionality, including that discussed elsewhere herein.

Further in accordance with the described embodiments, the disclosure herein generally addresses, inter alia, systems and methods for applying LIDAR technology to assist an impaired individual (e.g., a vision impaired individual). A server may receive LIDAR data generated from the LIDAR camera, and provide navigation feedback to a human individual based upon the LIDAR data. According to some aspects, the navigation feedback may be auditory or visual, and include direction and distance instructions to guide the human individual. The LIDAR data may be generated from a LIDAR camera harnessed to the human individual.

In yet another aspect, a computer-implemented method for assisting an impaired individual may be provided. The computer-implemented method may include, via one or more local or remote processors, transceivers, sensors, and/or servers, (1) receiving LIDAR data generated from a LIDAR camera, and/or (2) generating and/or providing navigation feedback to a human individual based upon the LIDAR data. The method may include additional, less, or alternate functionality, including that discussed elsewhere herein.

In yet another aspect, an electronic device for assisting an impaired individual may be provided. The electronic device may be configured to, via one or more processors, transceivers, and/or sensors, receive LIDAR data generated from the LIDAR camera, and/or generate and provide navigation feedback to a human individual based upon the LIDAR data.

In yet another aspect, a computer system for assisting an impaired individual may be provided. The system may include a LIDAR camera configured to be harnessed to a human individual, and a memory configured to store non-transitory computer executable instructions and configured to interface with a processor. The processor may be configured to execute the non-transitory computer executable instructions to cause the processor and/or an associated transceiver to receive LIDAR data generated from the LIDAR camera, and/or generate and provide navigation feedback to a human individual based upon the LIDAR data. The system may include additional, less, or alternate functionality, including that discussed elsewhere herein.

Advantages will become apparent to those skilled in the art from the following description. For example, in one aspect, the systems and methods disclosed herein advantageously produce a more accurate insurance quote than prior systems. In another aspect, the systems and methods disclosed herein advantageously provide a more accurate insurance claim to an insurance company than prior systems. In another aspect, a further advantage of the systems and methods disclosed herein is to provide faster first notice of loss to an insurance company than prior systems. In another aspect, a further advantage of the systems and methods disclosed herein is to provide an improved navigation system for impaired individuals (e.g., visually impaired individuals). Further advantages will become apparent to those of ordinary skill in the art from the following description.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The Figures described below depict various aspects of the applications, methods, and systems disclosed herein. It should be understood that each Figure depicts an embodiment of a particular aspect of the disclosed applications, systems and methods, and that each of the Figures is intended to accord with a possible embodiment thereof. Furthermore, wherever possible, the following description refers to the reference numerals included in the following Figures, in which features depicted in multiple Figures are designated with consistent reference numerals.

DETAILED DESCRIPTION

The present embodiments relate to, inter alia: (i) LIDAR technology; (ii) producing an insurance quote; (iii) producing an insurance claim; and (iv) technology for aiding an impaired individual.

LIDAR is a technology that measures distance to a target by illuminating the target (e.g., using laser light) and then measuring the reflected light with a sensor (e.g., measuring the time of flight from the laser signal source to its return to the sensor). Digital 3D representations of the target can then be made using differences in laser return times and wavelengths. LIDAR may be used to measure distances (e.g., the distance from a LIDAR camera to an object, the distance between objects, and so forth).

In this respect, LIDAR may create a 3D point cloud model (e.g., a set of data points in space) of a room or landscape by measuring many points in the room or landscape. Furthermore, as is understood in the art, 3D point clouds may be converted to 3D surfaces (e.g., by using techniques such as Delaunay triangulation, alpha shapes, or ball pivoting to build a network of triangles over existing vertices of the point cloud).

In this regard, some embodiments leverage this LIDAR information to produce a home insurance quote (or an insurance quote for any structure/building/architecture besides a home).

Exemplary Insurance Quote Generation System

Figure 1:
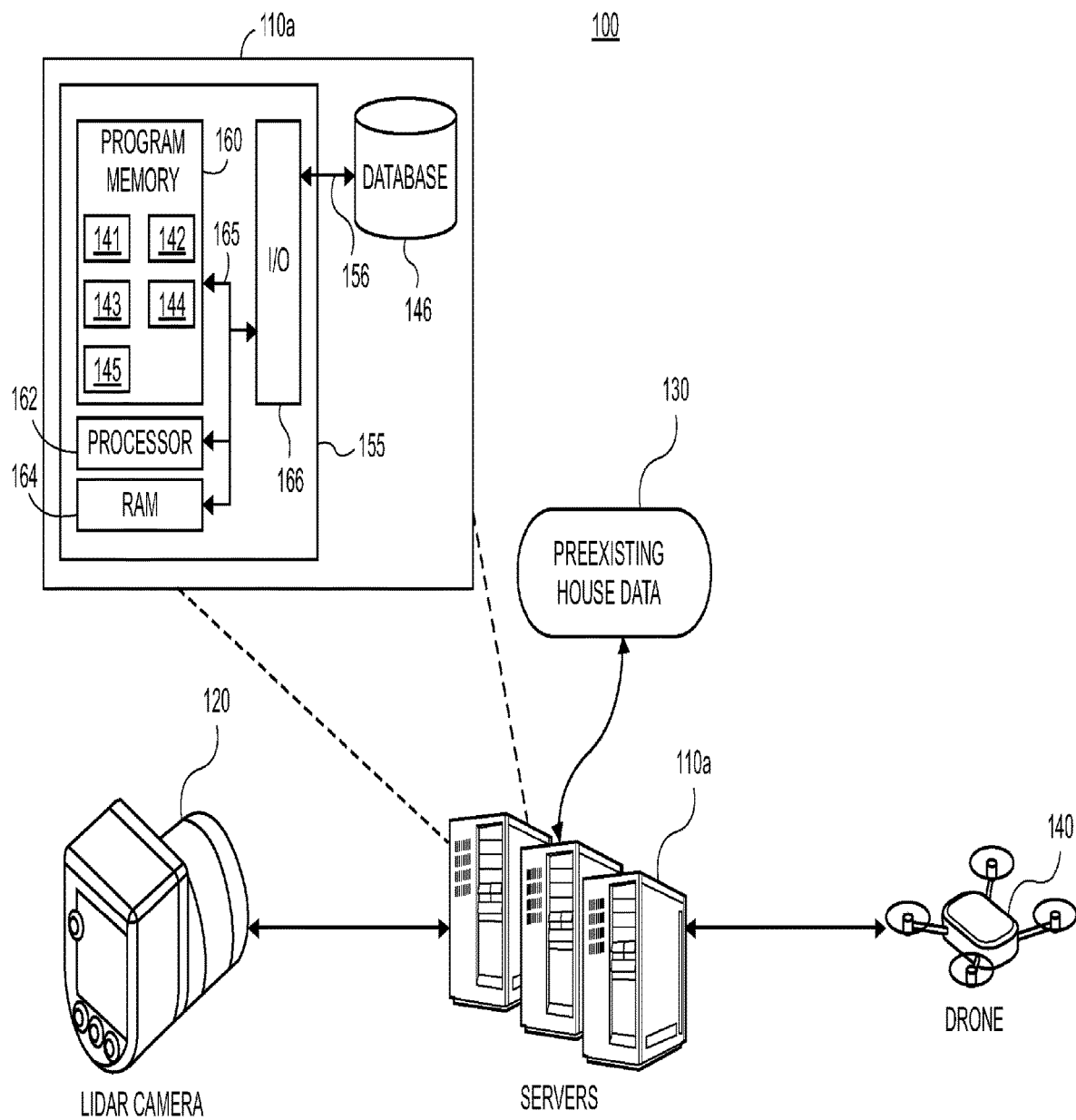
FIG. 1 shows an exemplary embodiment relating to determining a quote for home insurance.

FIG. 1 shows servers 110a (e.g., servers of an insurance company) sending and receiving information with LIDAR camera 120. The gathered data may include the dimensions of the house, including dimensions of part or all of the interior and exterior of the house. The LIDAR data may be used to create a partial or complete home map, and may include 3D point cloud(s) created from the LIDAR data. The LIDAR camera 120 may be operated by any human or machine.

In some embodiments, the LIDAR camera 120 is operated by an employee of the insurance company. For example, an insurance company employee may bring a LIDAR camera 120 to a house, and gather data on the house. Advantageously, LIDAR data could be analyzed at an office or elsewhere offsite from the home, thereby allowing the insurance company employee to spend only a small amount of time on a home premises (e.g., the insurance company employee could simply gather the LIDAR data and then leave the premises).

In other embodiments, this same LIDAR data is gathered by another individual besides an insurance company employee. For example, the LIDAR data may be gathered by a prospective home insurance purchaser.

The LIDAR data may be sent to the servers 110a by any method. For example, the LIDAR data may be sent to the servers 110a directly from the LIDAR camera 120 via the internet. In another example, the LIDAR data may be transferred from the LIDAR camera 120 to a computer (via, e.g., a cable, a USB device, or any other means), and then sent from the computer to the servers 110a by any methods (e.g., sent by the internet, by Ethernet connection, or so forth).

Each server 110a may include one or more computer processors adapted and configured to execute various software applications and components of insurance quote generation system 100, in addition to other software applications. The server 110a may further include a database 146, which may be adapted to store data related to the LIDAR camera 120, as well as any other data. The server 110a may access data stored in the database 146 when executing various functions and tasks associated with LIDAR technology and generating insurance quotes.

Although the insurance quote generation system 100 is illustrated to include one LIDAR camera 120, one drone 140, and one group of servers 110a (FIG. 1 is illustrated to show three servers 110a, but it should be understood that the server(s) 110a may be one or more server(s)), it should be understood that different numbers LIDAR camera 120, drone 140, and/or servers 110a may be utilized. For instance, the system 100 may include a plurality of servers 110a and hundreds of mobile LIDAR cameras 120 or drones 140. Furthermore, the database storage or processing performed by the one or more servers 110a may be distributed among a plurality of servers 110a in an arrangement known as "cloud computing." This configuration may provide various advantages, such as enabling near real-time uploads and downloads of information as well as periodic uploads and downloads of information.

The server 110a may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example.

The server 110a may further include a number of software applications stored in a program memory 160. The various software applications on the server 110a may include a LIDAR data monitoring application 141 for receiving information from LIDAR camera 120, a drone data monitoring application 142 for monitoring drone data, a receiving preexisting house data application 143, an architecture application 144 for creating baseline architecture data, and an insurance quote generation application 145 for generating an insurance quote. The various software applications may be executed on the same computer processor or on different computer processors. The servers 110a also gather data from other sources. For instance, the servers 110a also gather data from preexisting sources that have data on the home. For instance, data may be gathered from public records, property deeds, government records, realtors (e.g., from websites and apps that realtors post information to), previous insurance claims, and so forth.

The servers 110a also gather data from other sources. For example, the servers 110a also gather data from preexisting sources that have data on the home. For instance, data may be gathered from public records, property deeds, government records, realtors (e.g., from websites and apps that realtors post information to), previous insurance claims, and so forth.

The servers 110a also gather data from a drone 140. Such data may include data from a camera on the drone, a LIDAR camera on the drone, radio detection and ranging (RADAR) data gathered by the drone, global positioning system (GPS) data gathered by the drone, information from an infrared camera of the drone, and so forth.

A machine learning algorithm may be used to analyze any or all of the data held by servers 110a. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

In some embodiments, the preexisting house data 130 is used to create baseline data for the house. The baseline data is then combined with the LIDAR camera data 120 to create a house profile, which in turn may be used to generate an insurance quote for the house.

It should be understood that, over time, the servers 110a may accumulate a large pool of data on an individual home or a group of homes.

The data described above may be used (e.g., with a machine learning algorithm described above or by any other technique) to generate an insurance quote for home insurance. The machine learning algorithm may be trained using previously known home data along with previous insurance quotes.

The data described above may be used (e.g., with a machine learning algorithm described above or by any other technique) to predict the likelihood of an adverse event occurring to the home (e.g., fire, flood, wind damage, or so forth).

Exemplary Insurance Quote Generation Method

Figure 2:
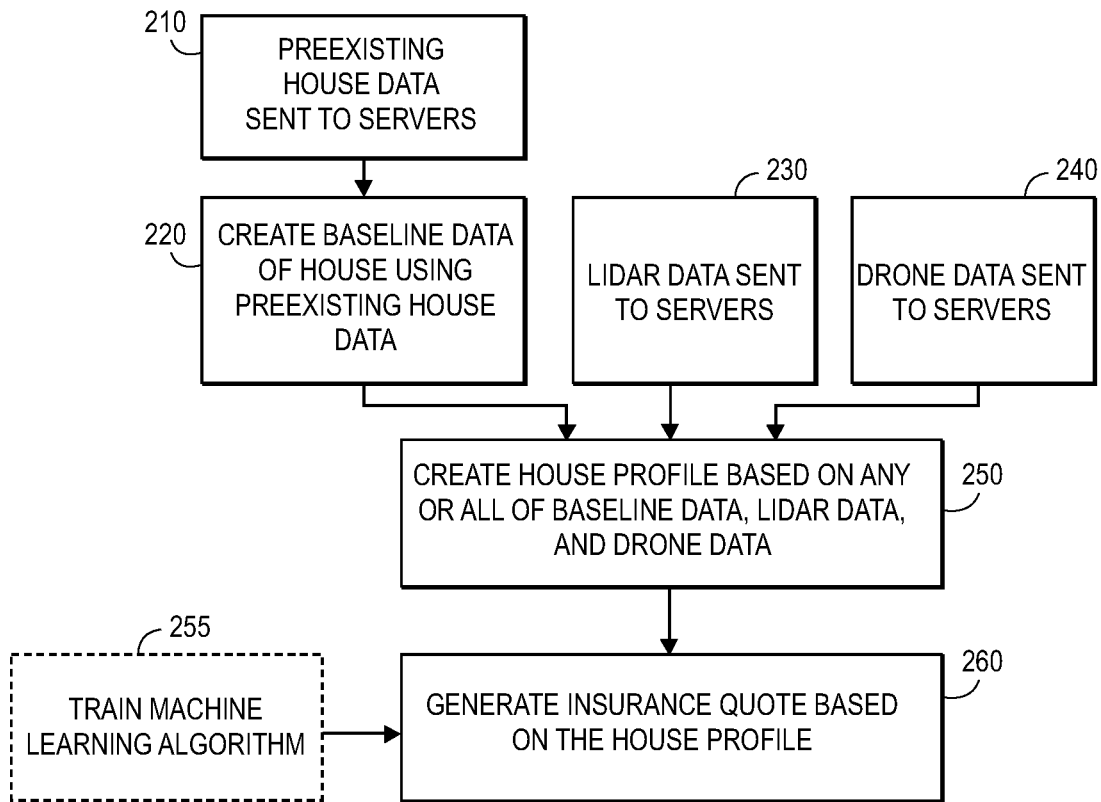
FIG. 2 shows a flowchart of an example of generating an insurance quote.

FIG. 2 shows a flowchart of an example of generating an insurance quote. With reference thereto, at step 210, the preexisting house data 130 is sent to servers 110a. At step 220, the preexisting house data is used to create a baseline data of the house. At step 230, data from the LIDAR camera 120 is sent to the servers 110a. At step 240, drone data is sent to the servers 110a. At step 250, a house profile is created based upon any or all of the baseline data, LIDAR data, and drone data. In an optional step 255, a machine learning algorithm is trained. At step 260, an insurance quote is generated based upon the house profile. The insurance quote may be generated using the trained machine learning algorithm or by any other technique.

Optionally, the insurance company may offer a discount to a home owner if the home owner allows LIDAR data of the house to be collected. In this regard, an insurance customer may opt-in to a rewards, insurance discount, or other type of program. After the insurance customer provides their affirmative consent, an insurance provider remote server, such as servers 110a, may collect data from the customer's mobile device, smart home controller, or other smart devices—such as with the customer's permission or affirmative consent. The data collected may also be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and/or other types of insurance from the insurance provider.

Further in this regard, in one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Exemplary Insurance Claim Generation System

Figure 3A:
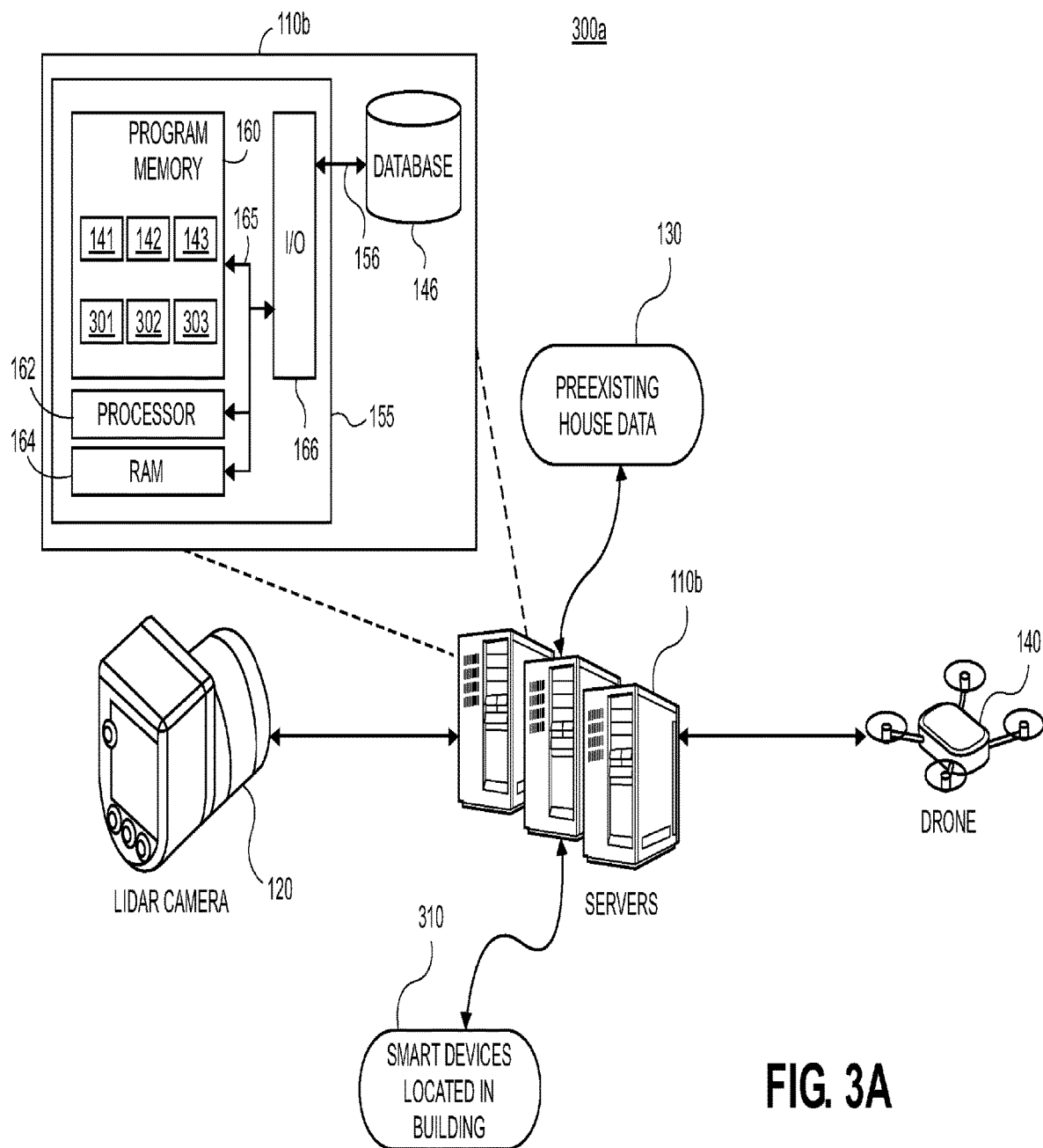
FIG. 3A shows an exemplary embodiment relating to determining an insurance claim.

In another aspect, in addition to generating an insurance quote, techniques for determining an insurance claim are contemplated; the techniques greatly expedite the insurance claims process, and will be described as follows. With reference to FIG. 3A, LIDAR camera 120 may be positioned in a home. It should be understood that the illustrated LIDAR camera 120 may represent a single LIDAR camera or multiple LIDAR cameras positioned throughout the home. The LIDAR camera 120 may be set up by any human or machine. In some embodiments, the LIDAR camera 120 is set up by an insurance company employee. In other embodiments, the LIDAR camera 120 is set up by a home owner using instructions from the insurance company; for example, the instructions may be sent by an insurance company via an app, website, paper mailing, or any other technique. In some embodiments, the LIDAR camera 120 provides real time data to the servers 110b.

Figure 3B:
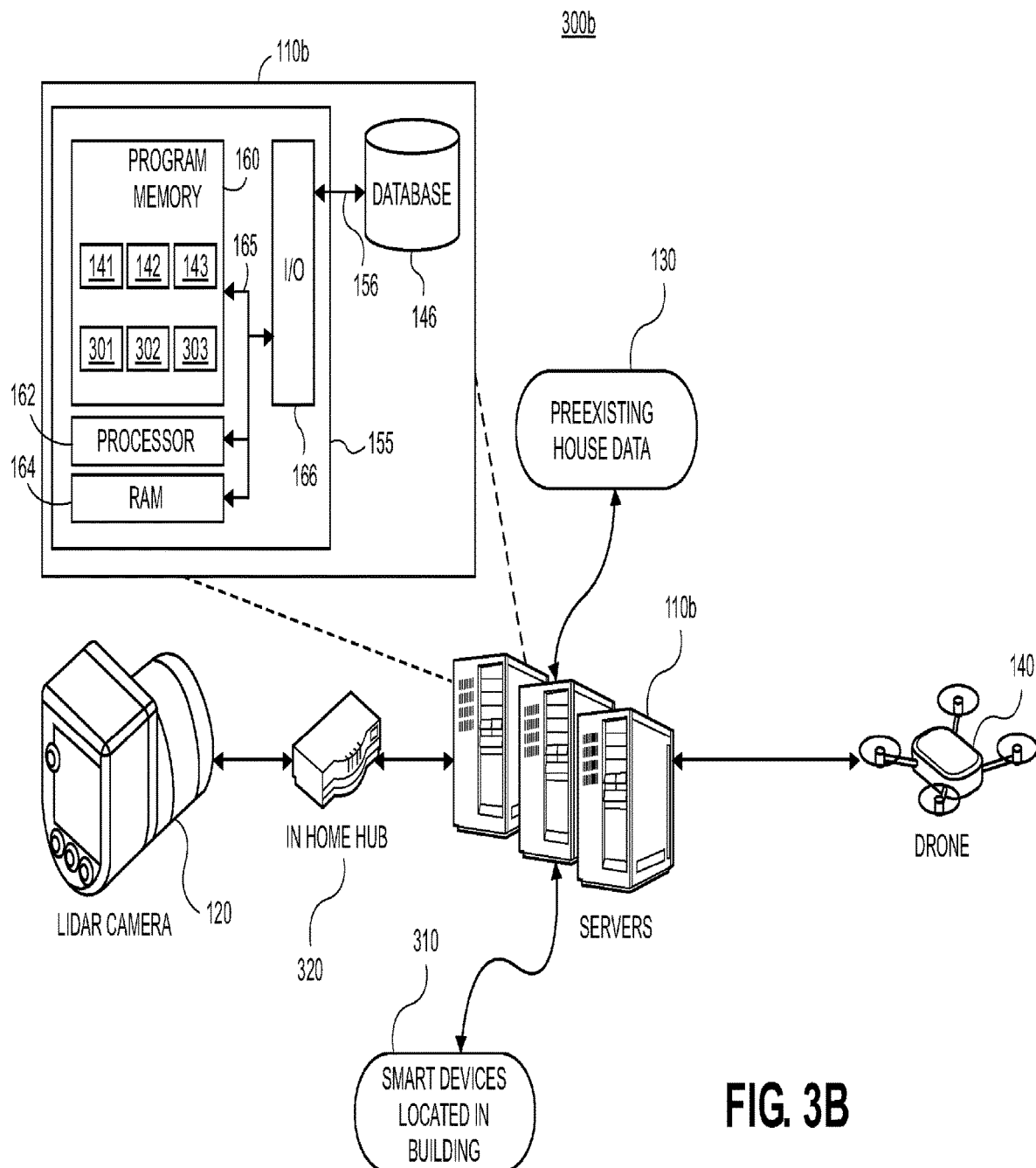
FIG. 3B shows an exemplary embodiment relating to determining an insurance claim, and including an in home hub.

Further regarding FIG. 3A, smart devices 310 also send smart device data to the servers 110b. The smart devices 310 may include, for example: speakers, cameras, lights, microphones, radios, thermostats, toothbrushes, motion sensors, infrared sensors, or any other devices. In the example of FIG. 3B, the smart devices 310 and LIDAR camera 120 send data to an in home hub 320, which in turn sends the collected data to servers 110b. In some embodiments, the in home hub sends the data to the servers 110b in real time; in other embodiments, the in home hub 320 collects data, and then sends the data in batches to the servers 110b.

With continuing reference to FIGS. 3A and 3B, the servers 110b may also receive data from drone 140 and preexisting house data 130. Each server 110b may include one or more computer processors adapted and configured to execute various software applications and components of insurance claim generation systems 300a, 300b, in addition to other software applications. The server 110b may further include a database 146, which may be adapted to store data related to the LIDAR camera 120, as well as any other data. The server 110b may access data stored in the database 146 when executing various functions and tasks associated with LIDAR technology and generating insurance claims and/or providing first notice of insurance claims.

Although the insurance claim generation systems 300a, 300b are illustrated to include one LIDAR camera 120, one drone 140, one group of smart devices 310, and one group of servers 110b (FIGS. 3A and 3B are each illustrated to show three servers 110b, but it should be understood that the server(s) 110b may be one or more server(s)), it should be understood that different numbers of LIDAR camera 120, drone 140, and/or servers 110b may be utilized. For instance, the system 100 may include a plurality of servers 110b and hundreds of mobile LIDAR cameras 120 or drones 140. Furthermore, the database storage or processing performed by the one or more servers 110b may be distributed among a plurality of servers 110b in an arrangement known as "cloud computing." This configuration may provide various advantages, such as enabling near real-time uploads and downloads of information as well as periodic uploads and downloads of information.

The server 110b may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example.

The server 110b may further include a number of software applications stored in a program memory 160. The various software applications on the server 110b may include a LIDAR data monitoring application 141 for receiving information from LIDAR camera 120, a drone data monitoring application 142 for monitoring drone data, a receiving preexisting house data application 143, a smart device receiving application 301 for receiving smart device data, an insurance claim generation application 302 for generating an insurance claim, and first notice providing application 303 for providing first notice of an insurance claim. The various software applications may be executed on the same computer processor or on different computer processors. It should be understood that, over time, the servers 110b may accumulate a large pool of data on an individual home or a group of homes.

The servers 110b may also receive data from drone 140 and preexisting house data 130. It should be understood that, over time, the servers 110b may accumulate a large pool of data on an individual home or a group of homes.

A machine learning algorithm may be used to analyze any or all of the data held by servers 110b. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

The servers 110b may use any of the received data to provide first notice of loss (e.g., by using a machine learning algorithm described above or by any other technique). For example, the servers 110b may use the received data to determine that an event relating to any of the following has occurred: fire, flood, wind, or burglary. Any of the received data may be used alone or in combination with any of the other received data to determine if an event has occurred. For example, data from the LIDAR camera 120 alone may be used to determine that high winds have broken a window; alternatively, in another example, data from the LIDAR camera 120 combined with data from a smart speaker may be used to determine that high winds have broken a window.

In another example, a machine learning algorithm is trained using previously known data (e.g., previously known LIDAR data, house dimensional data, drone data, smart device information data, and so forth); subsequently, real time LIDAR data from LIDAR camera 120 is input into the machine learning algorithm which determines that an event has occurred (e.g., a fire, flood, damage from hail, damage from wind or so forth); and first notice is then provided to the insurance company.

Any of the data received by the servers 110b can also be used to determine that a repair on a house has been completed (e.g., drywall has been repaired, a replacement window has been installed, or so forth). This is most often done after first notice to the insurance company was provided, and the claims process is underway or completed. The home owner may also provide notice to the insurance company that a repair has been completed. In this regard, the user may add comments to or annotate LIDAR data or other smart device data indicating that a repair is complete; for example, the annotations may be entered on an insurance company app.

Optionally, the insurance company may offer a discount to a home owner if the home owner allows LIDAR data of the house to be collected. In this regard, the user may install the LIDAR camera(s) about the home according to instructions provided by the insurance company, and then subsequently receive the insurance discount. In this way, an insurance customer may opt-in to a rewards, insurance discount, or other type of program. After the insurance customer provides their affirmative consent, an insurance provider remote server, such as servers 110b, may collect data from the customer's mobile device, smart home controller, or other smart devices—such as with the customer's permission or affirmative consent. The data collected may also be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and/or other types of insurance from the insurance provider.

Further in this regard, in one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Exemplary Insurance Claim Generation Method

Figure 4:
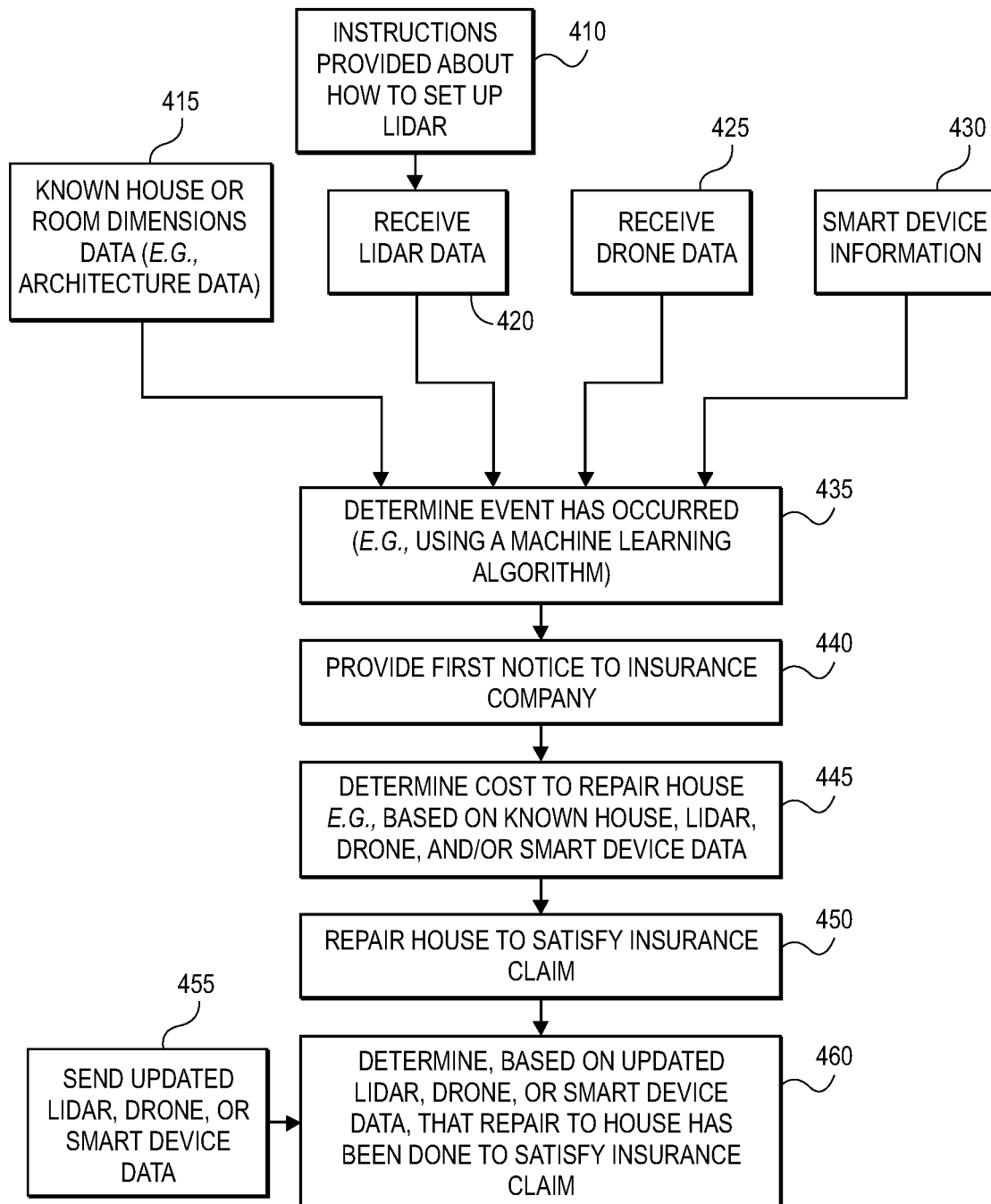
FIG. 4 shows a flowchart of an example of providing first notice of loss to an insurance company.

FIG. 4 shows a flowchart of an example of providing first notice to an insurance company. With reference thereto, at step 410, an insurance company provides instructions to a home owner (e.g., via an app, website, paper mailing, or any other technique) on how to set up a LIDAR camera. The LIDAR camera itself may also be provided to the home owner at this point. At step 415, known house data is provided to the insurance company. At step 420, LIDAR data from the LIDAR camera (possibly through a home hub) is received by the insurance company. At step 425, drone data from a drone is received by the insurance company. At step 430, smart device data from a smart device or from a home hub is received by the insurance company. At step 435, servers determine that an event has occurred (e.g., using a machine learning algorithm). At step 440, first notice to an insurance company occurs. For example, the determination that an event has occurred is effectively the first notice of loss, or first notice of potential loss, to the insurance company.

In certain embodiments, the first notice of loss may be provided to an insurance provider's and/or an insured's computing device. For instance, an electronic first notice of loss may be transmitted to an insurance provider server or an insured's mobile device, and then displayed for review and further action, such as completing, preparing, or handling an insurance claim.

At step 445, a determination (based upon, e.g., the known house, LIDAR, drone, and/or smart device data) is made as to the cost of a repair to satisfy the insurance claim. For instance, repair or replacement cost of one or more home features or characteristics may be estimated from processor analysis of LIDAR data and/or smart home sensor data. At step 450, a repair on the house is made to satisfy the insurance claim. At step 455, updated LIDAR, drone and/or smart device data is sent to the insurance company. At step 460, based upon updated LIDAR, drone, or smart device data, a determination is made that a repair to the house has been done to satisfy insurance claim.

In addition, although the foregoing refers to home insurance, it should be understood that any of the foregoing techniques may also be applied to insurance for buildings other than homes (e.g., applied to insurance for a building used for operation of a business, or any other building/structure/architecture/construction).

Exemplary System for Assisting an Impaired Individual

Figure 5A:
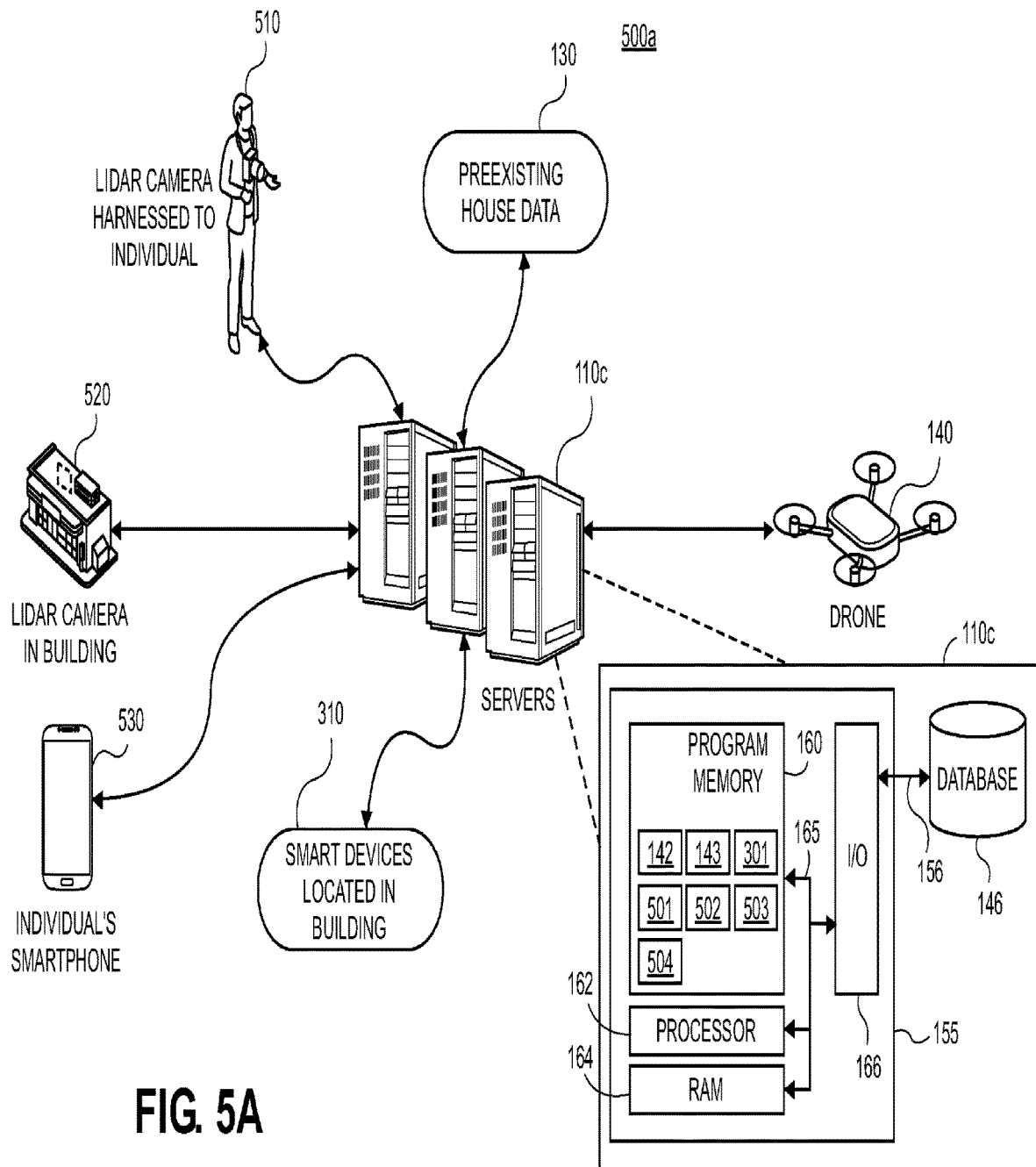
FIG. 5A shows an exemplary computer system to aide an impaired human individual.
Figure 5B:
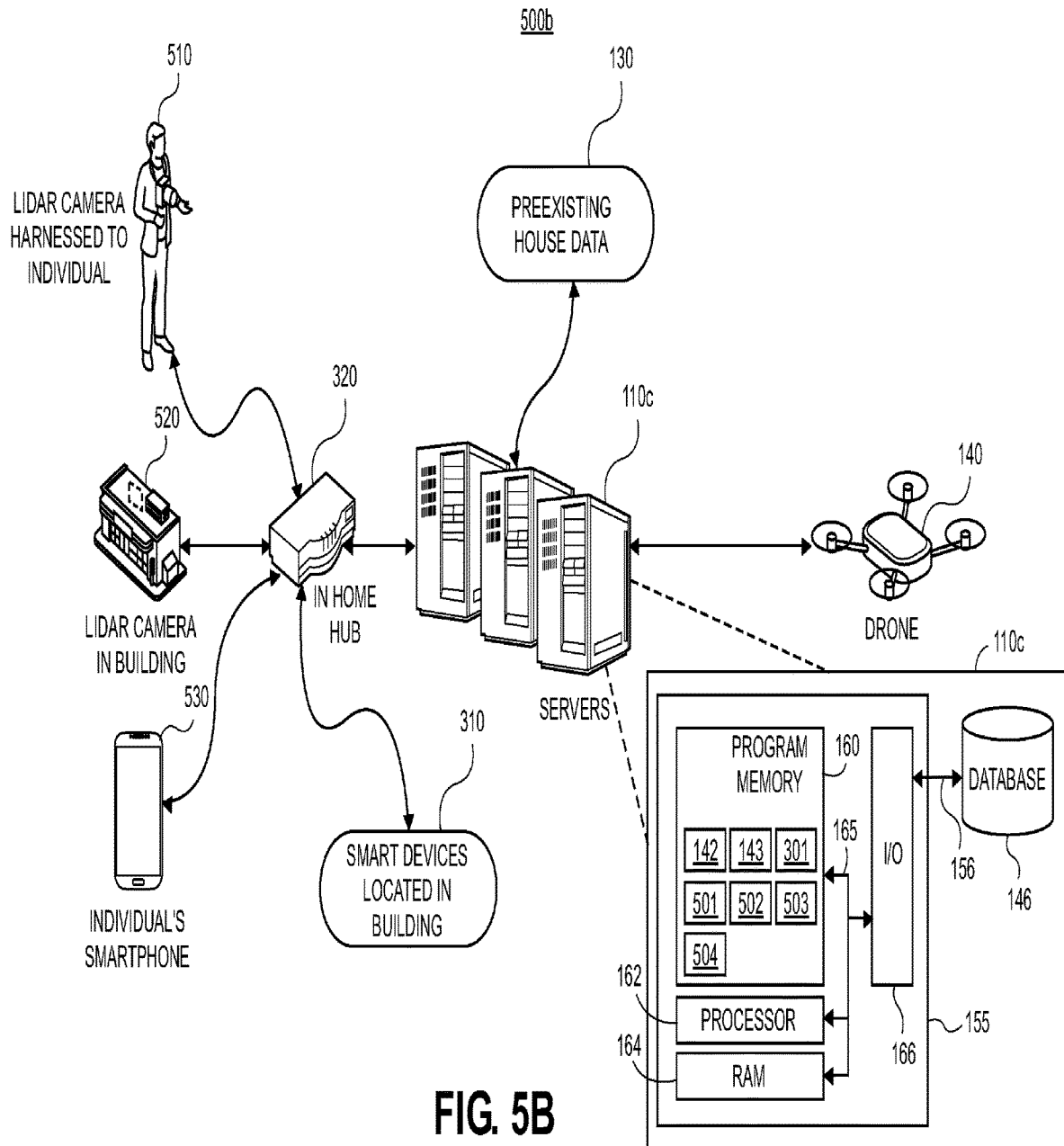
FIG. 5B shows an exemplary computer system to aide an impaired human individual where some data is sent to home hub 320 before being sent to servers 110c.

In another aspect, a LIDAR camera may be used to aide an individual. For example, a LIDAR camera may be used to aide an individual with a vision impairment or other disability. With reference to FIG. 5A, a LIDAR camera 510 harnessed to an individual provides data to servers 110c. Another (possibly stationary) LIDAR camera 520 also provides data to servers 110c. The individual's smartphone 530 also sends data, which may include, for example, GPS data, camera data, LIDAR data, and so forth to the servers 110c. With reference to FIG. 5B, data is sent to the servers 110c via an in home hub 320.

The data gathered by servers 110c may be used to aid an individual. The individual may or may not have a LIDAR camera 510 harnessed to herself. The aide provided may be in any form. For example, for an individual may be provided with auditory instructions on how to navigate a room. For instance, if the individual is walking towards an object (e.g., a table), the individual may receive an auditory warning that she is approaching the object, further receive auditory information on how close the object is (e.g., "a table is five feet in front of you"), and further receive auditory instructions on how to avoid the object (e.g., "move three feet to the left," or "turn 90 degrees to the left and then walk three feet"). In this regard, the auditory instructions may specify a direction and a distance for the individual to move.

The audio feedback may be provided to the individual through the individual's smartphone or though smart home devices such as smart speakers. Thus, smart speakers may direct an individual on ways to navigate a home. In addition, LIDAR cameras are able to detect rapidly moving objects. Thus, in some embodiments, if there is an object moving towards the individual, instructions are provided to the user on how to avoid the object. In some embodiments, a warning or notification that an object is approaching the individual is sent to the individual, and the warning or notification may be audio, visual, or haptic (e.g., the individual's smartphone vibrating).

In addition, GPS data from the individual's smartphone or mobile device or wearables, or from any other GPS device may be used to augment the LIDAR and other data.

Feedback may be provided to the individual even when the individual is not in the home. For example, if the LIDAR camera is harnessed to the individual, and the LIDAR detects that the individual is approaching a crosswalk and there is an approaching vehicle or object, feedback may be given to the individual not to enter the crosswalk. In this example, the feedback may be in the form of a warning or notification or in any other form. In another example, when the individual is outside the home, audio feedback may be provided to the individual through an earpiece.

In addition to auditory feedback, the feedback may also be visual, or haptic. For example, haptic feedback (e.g., the individual's smartphone 530 vibrating, or the individual's device holding the LIDAR camera 520 vibrating) may be generated if the individual is approaching an object. In one example of visual feedback, a visual warning that there is a fire, flood or structural damage (e.g., a window destroyed due to high wind or hail) may be generated. Visual feedback is primarily useful if the individual is not vision impaired.

The aide provided to the individual may be further based upon data from smart devices 310, from drone 140, or from an individual's smartphone or mobile device 530, or from an individual smart glasses or other wearable devices. Furthermore, the aide may be based upon preexisting house data 130, which may include a 3D map of all or part of the house. In this respect, the 3D map may be made from 3D point cloud(s) of the house that were made at any time (e.g., made as part of producing an insurance quote or insurance claim).

Further regarding FIGS. 5A and 5B, each server 110c may include one or more computer processors adapted and configured to execute various software applications and components of systems 500a, 500b for assisting an impaired individual, in addition to other software applications. The server 110c may further include a database 146, which may be adapted to store data related to the LIDAR camera harnessed to an individual 510, and/or LIDAR camera in building 520, as well as any other data. The server 110c may access data stored in the database 146 when executing various functions and tasks associated with LIDAR technology and providing assistance to an impaired individual.

Although the systems 500a, 500b are illustrated to include one LIDAR camera harnessed to an individual 510, one LIDAR camera in building 520, one individual's smartphone 530, one group of smart devices 310, one drone 140, and one group of servers 110c (FIGS. 5A and 5B are each illustrated to show three servers 110c, but it should be understood that the server(s) 110c may be one or more server(s)), it should be understood that different numbers of these items may be utilized. For instance, the system 100 may include a plurality of servers 110c and hundreds of mobile LIDAR cameras 120 or drones 140. Furthermore, the database storage or processing performed by the one or more servers 110c may be distributed among a plurality of servers 110c in an arrangement known as "cloud computing." This configuration may provide various advantages, such as enabling near real-time uploads and downloads of information as well as periodic uploads and downloads of information.

The server 110c may have a controller 155 that is operatively connected to the database 146 via a link 156. It should be noted that, while not shown, additional databases may be linked to the controller 155 in a known manner. For instance, separate databases may be used for storing different types of information and/or making different calculations. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example.

The server 110c may further include a number of software applications stored in a program memory 160. The various software applications on the server 110c may include, a drone data monitoring application 142 for monitoring drone data, a receiving preexisting house data application 143, a smart device receiving application 301 for receiving smart device data, a LIDAR camera harnessed to individual receiving application 501 for receiving LIDAR data from a LIDAR camera harnessed to an individual 510, a LIDAR camera in building application 502 for receiving LIDAR data from a LIDAR camera in building 520, individual's smartphone receiving application 503 for receiving data from an individual's smartphone 530, and feedback determination application 504 for determining feedback. The various software applications may be executed on the same computer processor or on different computer processors.

Exemplary Method for Assisting an Impaired Individual

Figure 6:
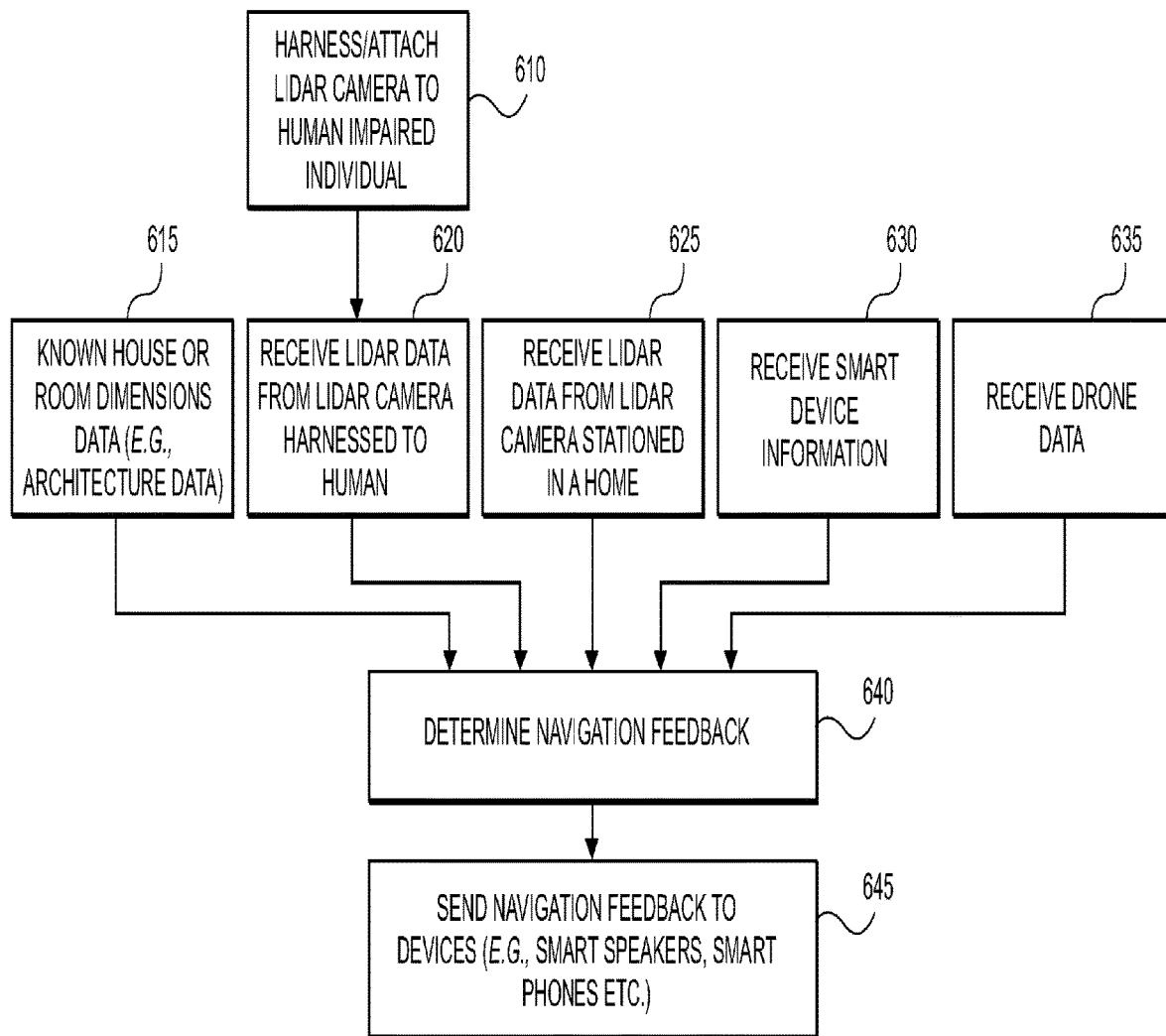
FIG. 6 shows a flowchart of an example of providing feedback to an impaired human individual.

FIG. 6 shows a flowchart of an example of providing assistance to an impaired individual (e.g., providing navigation instructions to a vision impaired individual). With reference thereto, at step 610, a LIDAR camera is harnessed to an impaired individual, or may be implanted into, or configured as part of, a wearable device, smart glasses, or smart headgear. At step 615, known house or room dimensional data (or other architectural data) is gathered and/or received. In some embodiments, house or room dimensional data may be generated from smart home or mobile device data, such as by processor analysis of smart home sensor data or camera images.

At step 620, LIDAR data is received from the LIDAR camera harnessed to the impaired individual, or otherwise worn by the individual. At step 625, LIDAR data is received from a LIDAR camera stationed in a home. For instance, one or more LIDAR cameras may be home-mounted and interconnected with a smart home controller, or other computing device, via one or more radio frequency links and/or wireless communication computing network.

At step 630, information from one or more smart devices is received. For instance, the smart devices may include smart sensors, smart cameras, mobile devices, wearables, or other computing devices. The smart devices may include processors and transceivers, and be configured for wireless communication or data transmission, such as a home computing network.

At step 635, drone data may be received. For instance, small drones configured with cameras, sensors, and/or transceivers may gather image and sensor data and transmit that data to a smart home controller, or other user computing device. The small drones may be configured to autonomously fly about the inside and/or outside of the home, and gather sensor and image data.

At step 640, navigation feedback is determined. For instance, a smart home controller that is collecting and receiving various sensor and image data, including LIDAR data, as well as mobile device data, smart home sensor and image data, drone data, wearable data, etc., may analyze that data. The smart home controller may determine which room a vision impaired individual is located, a direction of their movement, obstacles in the direction of their movement (such as chairs, desks, tables, beds, televisions, etc.), and generate warnings and courses of movement for the individual to avoid the obstacles as they move about the home.

At step 645, the navigation feedback is sent (e.g., to smart devices, smart speakers, and so forth). For instance, a smart home controller may transmit movement instructions to the individual's mobile device or audibly present the movement instructions via a speaker associated with the smart home controller.

Exemplary Method for Generating Personal Articles Insurance Quote

Figure 7:
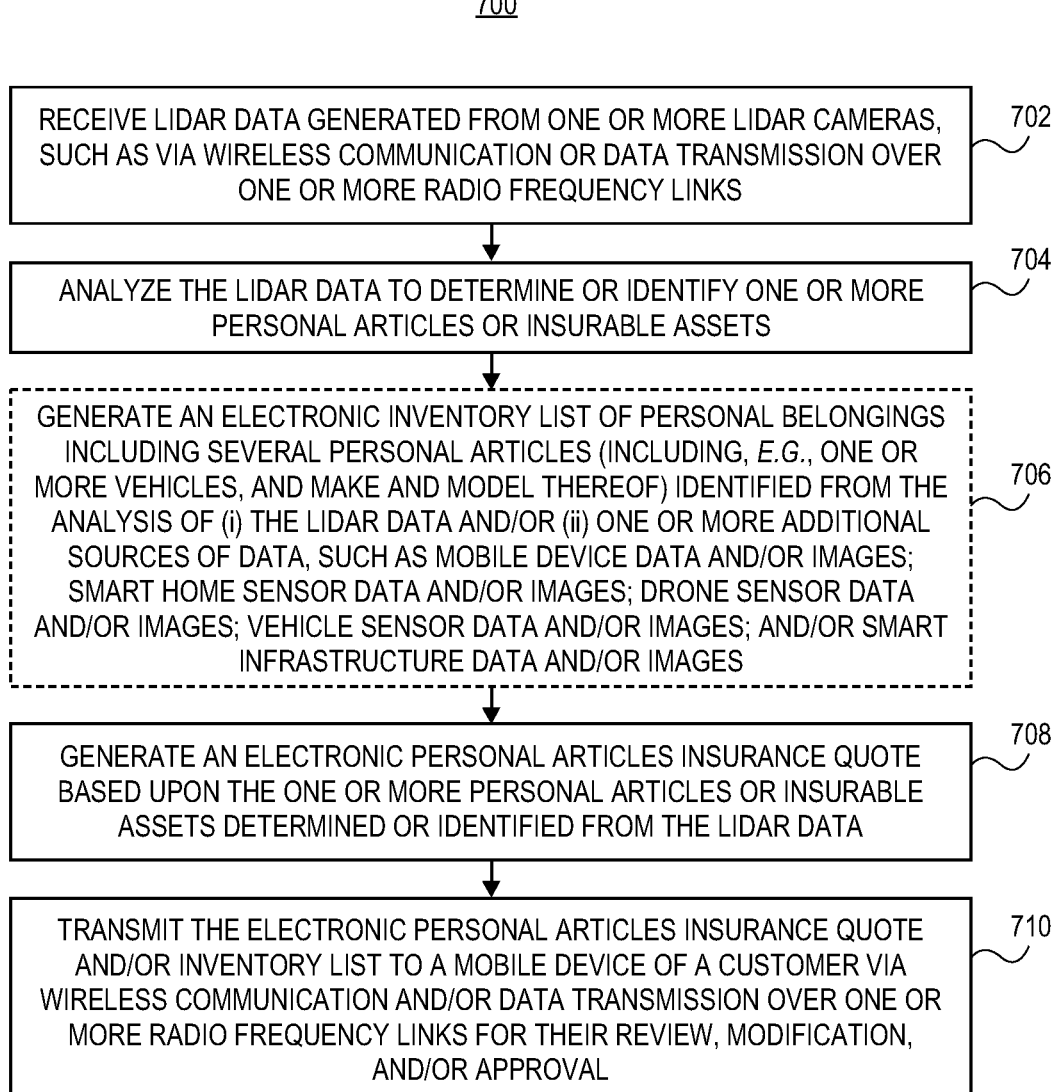
FIG. 7 illustrates a flow diagram of an exemplary computer-implemented method of generating a personal articles insurance quote in accordance with the presently described embodiments.

FIG. 7 illustrates a flow diagram of an exemplary method 700 for generating a personal articles insurance quote. At block 702, the servers may receive the LIDAR data generated from one or more LIDAR cameras 120, such as via wireless communication or data transmission over one or more radio frequency links and/or via a communication network. For instance, LIDAR data may be received at a smart home controller via a home wireless communication network and a transceiver of the smart home controller.

At block 704, the LIDAR data may be analyzed, via one or more processors (such as at a smart home controller), to determine or identify one or more personal articles or insurable assets. In some embodiments, the LIDAR data may be analyzed with, or combined with, other sources of data for enhanced accuracy. For instance, a smart home controller may receive sensor and image data from several sources, such as data from mobile devices, wearables, smart glasses, smart headgear, home-mounted sensors and cameras, televisions, etc. that interconnected with a home wireless communication network.

At block 706, in an optional step, the servers may generate an electronic inventory list of personal belongings including several personal articles (including, e.g., one or more vehicles, and make and model thereof) identified from the analysis of the LIDAR data. The inventory list may also be generated from one or more additional sources of data, such as mobile device data and/or images; smart home sensor data and/or images; drone sensor data and/or images; vehicle sensor data and/or images; and/or smart infrastructure data and/or images. The generated inventory list may further include one or more electronic devices, televisions, furniture, antiques, paintings, and other insurable assets.

At block 708, the servers may generate an electronic personal articles insurance quote based upon the one or more personal articles or insurable assets determined or identified from the LIDAR data. At block 710, the server may transmit the electronic personal articles insurance quote and/or inventory list to a mobile device of a customer via wireless communication and/or over one or more radio frequency links for their review, modification, and/or approval.

Exemplary Method for Generating an Inventory List of Personal Belongings

Figure 8:
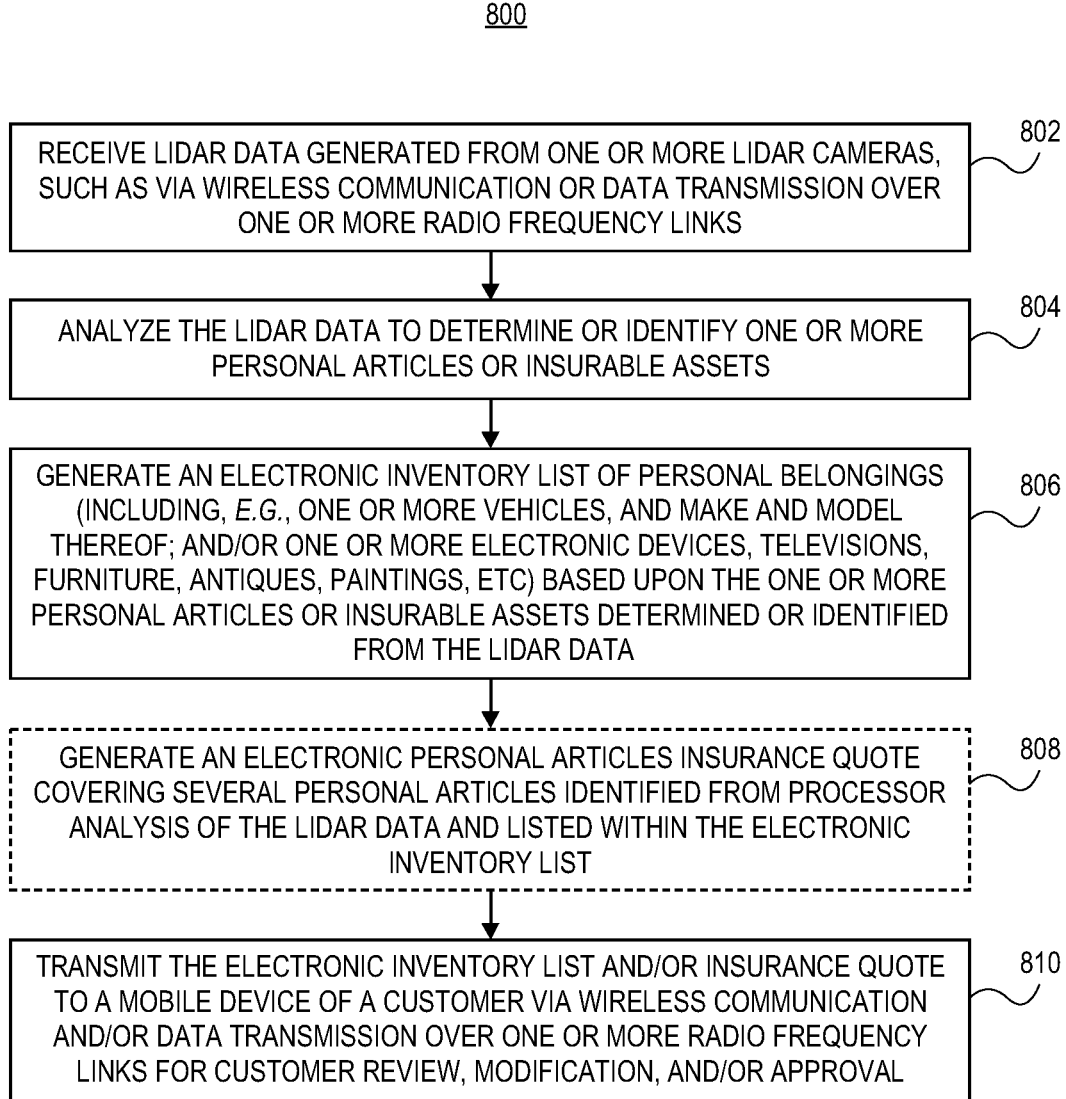
FIG. 8 illustrates a flow diagram of an exemplary computer-implemented method of generating an inventory list of personal belongings in accordance with the presently described embodiments.

FIG. 8 illustrates a flow diagram of an exemplary method 800 for generating a personal articles insurance quote. At block 802, the servers may receive the LIDAR data generated from one or more LIDAR cameras 120, such as via wireless communication or data transmission over one or more radio frequency links. At block 804, the LIDAR data may be analyzed to determine or identify one or more personal articles or insurable assets.

At block 806, an electronic inventory list of personal belongings may be generated based upon the one or more personal articles or insurable assets determined or identified from the LIDAR data. The inventory list may also be generated from one or more additional sources of data, such as mobile device data and/or images; smart home sensor data and/or images, including data from one or more sensors or cameras mounted in a garage; drone sensor data and/or images; vehicle sensor data and/or images; and/or smart infrastructure data and/or images. The generated inventory list may further include one or more vehicles, electronic devices, televisions, furniture, antiques, paintings, and so forth.

At block 808, in an optional step, an electronic personal articles insurance quote may be generated covering several personal articles identified from processor analysis of the LIDAR data and listed within the electronic inventory list. At block 810, the electronic inventory list and/or insurance quote may be transmitted to a mobile device of a customer via wireless communication and/or over one or more radio frequency links for customer review, modification, and/or approval.

Exemplary Method for Generating a Homeowners Insurance Quote

Figure 9:
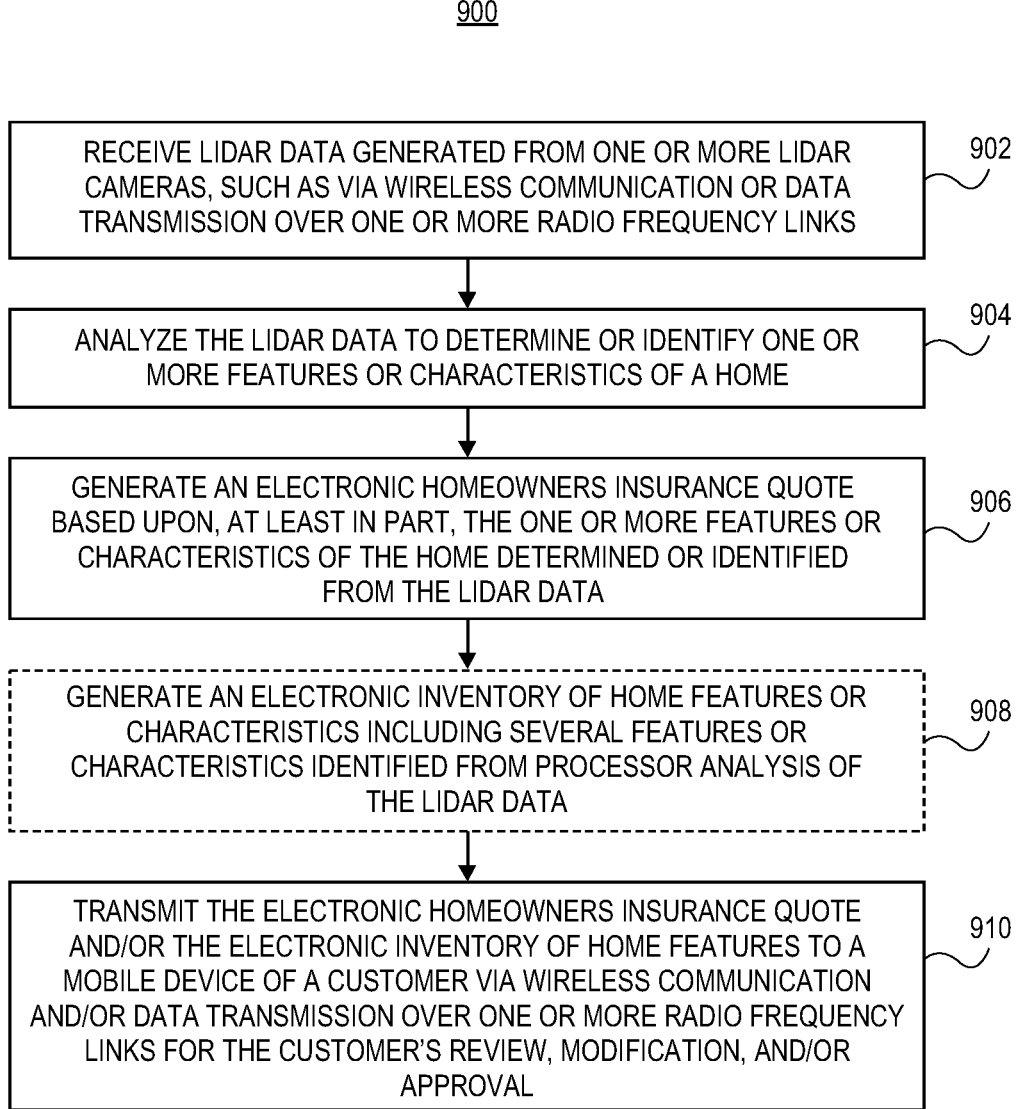
FIG. 9 illustrates a flow diagram of an exemplary computer-implemented method of generating a homeowners insurance quote in accordance with the presently described embodiments.

FIG. 9 illustrates a flow diagram of an exemplary method for generating a homeowners insurance quote. At block 902, the servers may receive the LIDAR data generated from one or more LIDAR cameras 120, such as via wireless communication or data transmission over one or more radio frequency links. For instance, LIDAR data may be received at a smart home controller via a home wireless communication network and a transceiver of the smart home controller.

In some embodiments, the LIDAR data may be analyzed with, or combined with, other sources of data for enhanced accuracy. For instance, a smart home controller may receive sensor and image data from several sources, such as data from mobile devices, wearables, smart glasses, smart headgear, home-mounted sensors and cameras, televisions, smart vehicles, etc. that are interconnected with a home wireless communication network.

At block 904, the LIDAR data (either alone in combination with the additional sources of data) may be analyzed to determine or identify one or more features or characteristics of a home. The one or more features or characteristics of the home determined or identified from the LIDAR data (either alone in combination with the additional sources of data) may include: (1) type of flooring, carpet, or tile; (2) type of fixtures; (3) type of cabinets; (4) number and size of bedrooms; (5) number and size of bathrooms; (6) size of garage; (7) type of siding; (8) type of roofing materials; (9) type of windows; and/or (10) number and/or size of rooms.

At block 906, an electronic homeowners insurance quote may be generated based upon, at least in part, the one or more features or characteristics of the home determined or identified from the LIDAR data. At block 908, in an optional step, an electronic inventory of home features or characteristics may be generated including several features or characteristics identified from processor analysis of the LIDAR data. At block 910, the electronic homeowners insurance quote and/or the electronic inventory of home features may be transmitted to a mobile device of a customer via wireless communication and/or over one or more radio frequency links for the customer's review, modification, and/or approval.

Exemplary Method for Insurance Claim Generation from Lidar Data

Figure 10:
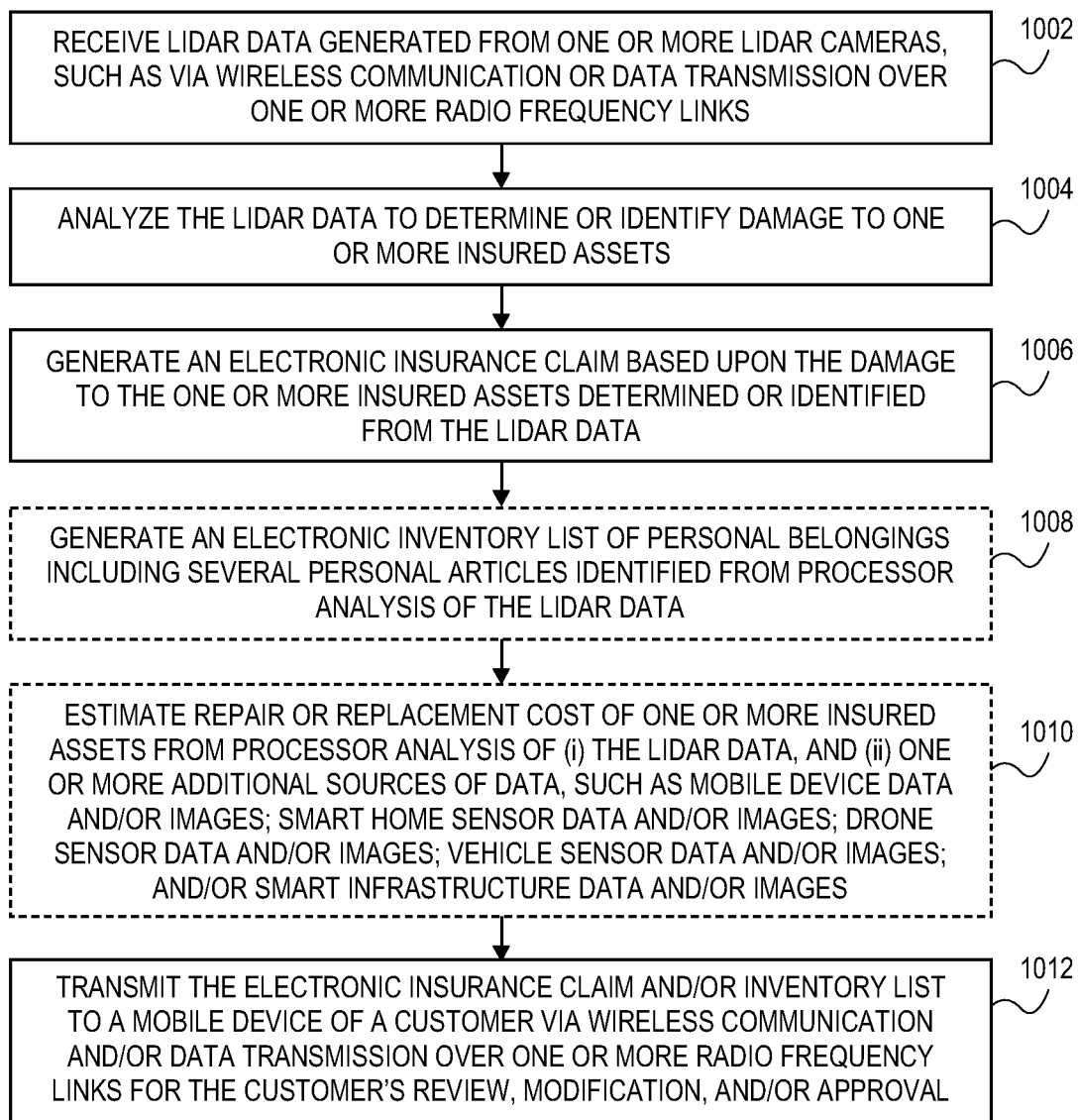
FIG. 10 illustrates a flow diagram of an exemplary computer-implemented method of insurance claim generation from LIDAR data in accordance with the presently described embodiments.

FIG. 10 illustrates a flow diagram of an exemplary method for generating an insurance claim. At block 1002, the servers may receive the LIDAR data generated from one or more LIDAR cameras 120, such as via wireless communication or data transmission over one or more radio frequency links. For instance, LIDAR data may be received at a smart home controller via a home wireless communication network and a transceiver of the smart home controller.

In some embodiments, the LIDAR data may be analyzed with, or combined with, other sources of data for enhanced accuracy. For instance, a smart home controller may receive sensor and image data from several sources, such as data from mobile devices, wearables, smart glasses, smart headgear, home-mounted sensors and cameras, televisions, smart vehicles, etc. that are interconnected with a home wireless communication network.

At block 1004, the LIDAR data (either alone or in combination with the data received from the additional sources mentioned above) may be analyzed to determine or identify damage to one or more insured assets. The one or more insured assets may be a home, and the damage identified from processor analysis of the LIDAR data (either alone or in combination with the data received from the additional sources mentioned above) may be home damage or damage to one or more home features or characteristics. The one or more insured assets may include one or more personal articles, and the damage identified from processor analysis of the LIDAR data (either alone or in combination with the data received from the additional sources mentioned above) may be home damage or damage to the one or more personal articles. To further identify the damage to the one or more insured assets, one or more additional sources of data may be analyzed such as such as mobile device data and/or images; smart home sensor data and/or images; drone sensor data and/or images; vehicle sensor data and/or images; and/or smart infrastructure data and/or images.

At block 1006, a proposed electronic insurance claim may be generated based upon the damage to the one or more insured assets determined or identified from the LIDAR data (either alone or in combination with the data received from the additional sources mentioned above). The proposed electronic insurance claim may be for customer review, modification, and/or approval.

At block 1008, in an optional step, an electronic inventory list of personal belongings may be generated including several personal articles identified from processor analysis of the LIDAR data (either alone or in combination with the data received from the additional sources mentioned above). At block 1010, in another optional step, repair or replacement cost of one or more insured assets may be estimated from processor analysis of (i) the LIDAR data, and (ii) one or more additional sources of data, such as mobile device data and/or images; smart home sensor data and/or images; drone sensor data and/or images; vehicle sensor data and/or images; and/or smart infrastructure data and/or images.

At block 1012, the electronic insurance claim and/or electronic inventory list may be transmitted to a mobile device of a customer via wireless communication and/or over one or more radio frequency links for the customer's review, modification, and/or approval.

Exemplary Method for Providing First Notice of Loss

Figure 11:
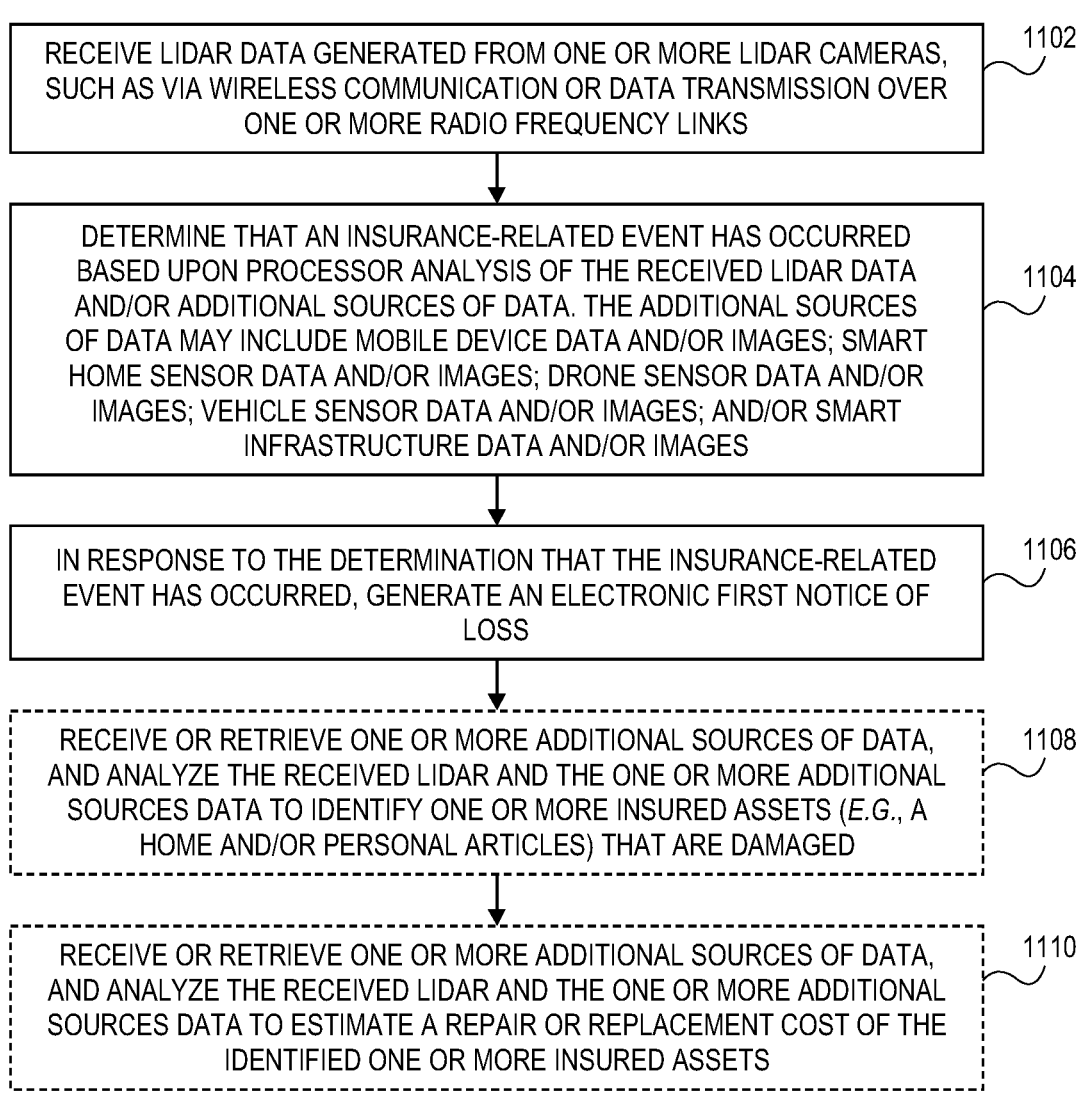
FIG. 11 illustrates a flow diagram of an exemplary computer-implemented method of providing first notice of loss in accordance with the presently described embodiments.

FIG. 11 illustrates a flow diagram providing first notice of loss. At block 1102, the servers may receive the LIDAR data generated from one or more LIDAR cameras 120, such as via wireless communication or data transmission over one or more radio frequency links. At block 1104, the servers may determine that an insurance-related event has occurred based upon processor analysis of the received LIDAR data and/or additional sources of data. The additional sources of data may include mobile device data and/or images; smart home sensor data and/or images; drone sensor data and/or images; vehicle sensor data and/or images; and/or smart infrastructure data and/or images.

At block 1106, in response to the determination that the insurance-related event has occurred, the servers may generate an electronic first notice of loss. At block 1108, in an optional step, the servers may receive or retrieve one or more additional sources of data, and analyze the received LIDAR and the one or more additional sources data to identify one or more insured assets (e.g., a home and/or personal articles) that are damaged. At block 1110, in another optional step, the servers may receive or retrieve one or more additional sources of data, and analyze the received LIDAR and/or the one or more additional sources data to estimate a repair or replacement cost of the identified one or more insured assets.

Exemplary Method for Navigation for the Vision Impaired

Figure 12:
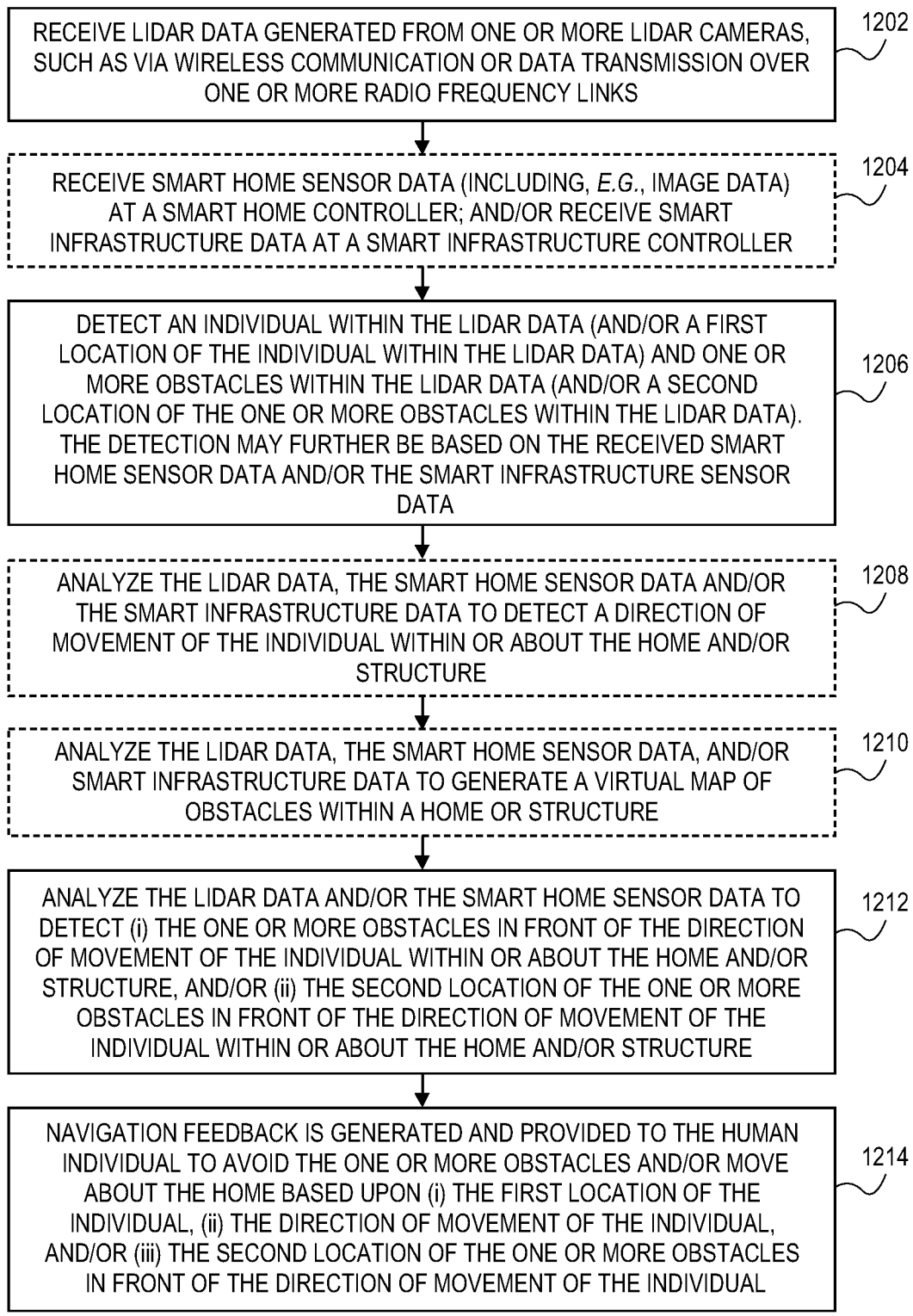
FIG. 12 illustrates a flow diagram of an exemplary computer-implemented method of navigation for the vision impaired in accordance with the presently described embodiments.

FIG. 12 illustrates a flow diagram for navigation for the vision impaired. Although the following description refers to servers, it should be understood that some or all of the steps may be instead performed by a mobile computing device or other processing device. At block 1202, the servers may receive the LIDAR data generated from one or more LIDAR cameras 120, such as via wireless communication or data transmission over one or more radio frequency links. For instance, LIDAR data may be received at a smart home controller via a home wireless communication network and a transceiver of the smart home controller.

In some embodiments, the LIDAR data may be analyzed with, or combined with, other sources of data for enhanced accuracy. For instance, a smart home controller may receive sensor and image data from several sources, such as data from mobile devices, wearables, smart glasses, smart headgear, home-mounted sensors and cameras, televisions, smart vehicles, etc. that are interconnected with a home wireless communication network.

As noted, in some embodiments, the LIDAR data may be received and/or collected at a smart home controller and/or a smart infrastructure controller. At block 1204, in an optional step, smart home sensor data (including e.g., image data) may be received at the smart home controller; and/or smart infrastructure sensor data may be received at the smart infrastructure controller.

At block 1206, the servers may detect an individual within the LIDAR data (and/or a first location of the individual within the LIDAR data) and one or more obstacles within the LIDAR data (and/or a second location of the one or more obstacles within the LIDAR data). The detection may further be based upon the received smart home sensor data, in some embodiments.

At block 1208, in an optional step, the LIDAR data and/or the smart home sensor data may be analyzed to detect a direction of movement of the individual within or about the home and/or structure. At block 1210, in an optional step, the LIDAR data and/or the smart home sensor data may be analyzed to generate a virtual map of obstacles within a home and/or structure.

At block 1212, the LIDAR data and/or the smart home sensor data may be analyzed to detect (i) the one or more obstacles in front of the direction of movement of the individual within or about the home and/or structure, and/or (ii) the second location of the one or more obstacles in front of the direction of movement of the individual within or about the home and/or structure.

At block 1214, navigation feedback may be generated and provided to the human individual to avoid the one or more obstacles and/or move about based upon (i) the first location of the individual, (ii) the direction of movement of the individual, and/or (iii) the second location of the one or more obstacles in front of the direction of movement of the individual. The navigation feedback may be auditory, and may comprise direction and distance instructions to guide the individual and avoid the one or more obstacles. The navigation feedback may also be haptic or visual (such as bright lights) in some embodiments.

Exemplary Insurance Quote Generation Functionality

In one aspect, a computer-implemented method for generating an insurance quote may be provided. The method may include, via one or more local or remote processors, transceivers, sensors, and/or servers: (1) receiving preexisting architecture data; (2) creating baseline architecture data using the preexisting architecture data; (3) receiving LIDAR data generated from a LIDAR camera; (4) combining the baseline architecture data with the LIDAR data to create an architecture profile; and/or (5) generating the insurance quote based upon the architecture profile.

The preexisting architecture data may include a property deed record. The method may further include receiving drone data, and the architecture profile may be created further based upon the received drone data.

The method may further include training a machine learning algorithm using previous architecture data and previous insurance quotes, and the insurance quote may be generated by inputting the architecture profile into the trained machine learning algorithm.

The LIDAR data may include 3D point cloud data indicating dimensions of a room of a house. Additionally or alternatively, the LIDAR data may include data of both an exterior and an interior of a building.

The method may further include using the architecture profile to predict a likelihood of an event, the event comprising one of: a fire event, a flood event, or a wind damage event. The building profile may be a profile of a house. The method may include additional, less, or alternate actions, including those discussed elsewhere herein.

In another aspect, an electronic device for generating an insurance quote may be provided. The electronic device may be configured to, via one or more processors, transceivers, and/or sensors: (1) receive preexisting architecture data; (2) create baseline architecture data using the preexisting architecture data; (3) receive LIDAR data generated from a LIDAR camera; (4) combine the baseline architecture data with the LIDAR data to create an architecture profile; and (5) generate the insurance quote based upon the architecture profile.

The preexisting architecture data may include a property deed record. The electronic device may further be configured to receive drone data, and create the architecture profile further based upon the received drone data.

The electronic device may further be configured to train a machine learning algorithm using previous architecture data and previous insurance quotes, and generate the insurance quote by inputting the architecture profile into the trained machine learning algorithm. The LIDAR data may include 3D point cloud data indicating dimensions of a room of a house.

The LIDAR data may include data of both an exterior and an interior of a building. The electronic device may further be configured to use the architecture profile to predict a likelihood of an event. The event may include one of: a fire event, a flood event, or a wind damage event. The electronic device may include additional, less, or alternate functionality, including that discussed elsewhere herein.

In another aspect, a computer system for generating an insurance quote may be provided. The system may include a LIDAR camera, and a memory configured to store non-transitory computer executable instructions and configured to interface with a processor. The processor may be configured to interface with the memory, and may be further configured to execute the non-transitory computer executable instructions to cause the processor and/or an associated transceiver to: (1) receive preexisting architecture data; (2) create baseline architecture data using the preexisting architecture data; (3) receive LIDAR data generated from a LIDAR camera; (4) combine the baseline architecture data with the LIDAR data to create an architecture profile; and/or (5) generate the insurance quote based upon the architecture profile.

The system may further include a drone configured to gather drone data. The processor may be further configured to execute the non-transitory computer executable instructions to cause the processor to create the architecture profile further based upon the drone data. The processor may be further configured to execute the non-transitory computer executable instructions to cause the processor to: train a machine learning algorithm using previous architecture data and previous insurance quotes; and generate the insurance quote by inputting the architecture profile into the trained machine learning algorithm.

The LIDAR data may include data of both an exterior and an interior of a building. The processor may be further configured to execute the non-transitory computer executable instructions to cause the processor to use the architecture profile to predict a likelihood of an event. The event may include one of: a fire event, a flood event, or a wind damage event. The computer system may include additional, less, or alternate functionality, including that discussed elsewhere herein.

Exemplary Insurance Claim Generation Functionality

In another aspect, a computer-implemented method for providing first notice of loss may be provided. The method may include, via one or more local or remote processors, transceivers, sensors, and/or servers: (1) receiving LIDAR data generated from a LIDAR camera; (2) determining that an event has occurred based upon the received LIDAR data; and/or (3) in response to the determination that the event has occurred, generating and/or providing an electronic or virtual first notice of loss. The first notice of loss may be provided to an insurance provider's and/or an insured's computing device. For instance, an electronic first notice of loss may be transmitted to an insurance provider server or an insured's mobile device, and then displayed for review and further action, such as completing, handling, or preparing an insurance claim. The method may include additional, less, or alternate actions, including those discussed elsewhere herein.

For instance, the method may further include, via the one or more local or remote processors, transceivers, sensors, and/or servers: (1) receiving smart device data from a smart device, and the determination that an event has occurred may be further based upon the received smart device data; (2) receiving architecture data including dimensional data of a building, and the determination that an event has occurred may be further based upon the received architecture data; and/or (3) receiving drone data from a drone, and the determination that an event has occurred may be further based upon the received drone data. The determination that an event has occurred may be made by using the LIDAR data in conjunction with a machine learning algorithm.

The method may further include training a machine learning algorithm using previously known dimensional data, and event data, and the determination that an event has occurred may be made by inputting the LIDAR data into the machine learning algorithm. The method may further include: prior to receiving the LIDAR data, sending instructions to a user on how to install the LIDAR camera. The method may further include: determining that a repair to a house has been completed; and in response to the determination that the repair has been completed, providing notice that an insurance claim has been satisfied.

In another aspect, an electronic device for providing first notice of loss may be provided. The electronic device may be configured to, via one or more processors, transceivers, and/or sensors: (1) receive LIDAR data generated from a LIDAR camera; (2) determine if an event has occurred based upon the received LIDAR data; and (3) if the event has occurred, generate and provide an electronic or virtual first notice of loss. The electronic device may include additional, less, or alternate functionality, including that discussed elsewhere herein.

For instance, the electronic device may be further configured to receive smart device data from a smart device, and determine if the event has occurred further based upon the received smart device data. The electronic device may be further configured to: receive architecture data including dimensional data of a building; and determine if the event has occurred further based upon the received architecture data. The electronic device may be further configured to: receive drone data; and determine if the event has occurred further based upon the received drone data. The electronic device may be further configured to: train a machine learning algorithm using previously known dimensional data, and event data; and determine if the event has occurred by inputting the LIDAR data into the machine learning algorithm. The electronic device may be further configured to provide an offer to discount an insurance policy if the user agrees to set up the LIDAR camera in a house of the user.

In another aspect, a computer system for providing first notice of loss may be provided. The system may include: a LIDAR camera, and a memory configured to store non-transitory computer executable instructions and configured to interface with a processor. The processor may be configured to interface with the memory, and further configured to execute the non-transitory computer executable instructions to cause the processor and/or an associated transceiver to: (1) receive LIDAR data generated from the LIDAR camera; (2) determine if an event has occurred based upon the received LIDAR data; and (3) if the event has occurred, generate and provide an electronic or virtual first notice of loss. The system may include additional, less, or alternate functionality, including that discussed elsewhere herein.

For instance, the system may further include a smart device configured to gather smart device data. The processor may be further configured to execute the non-transitory computer executable instructions to cause the processor to determine if the event has occurred further based upon the smart device data.

The system may further include a drone configured to gather drone data. The processor may be further configured to execute the non-transitory computer executable instructions to cause the processor to determine if the event has occurred further based upon the drone data.

The processor may further be configured to execute the non-transitory computer executable instructions to cause the processor to: train a machine learning algorithm using previously known dimensional data, and event data; and determine if the event has occurred by inputting the LIDAR data into the machine learning algorithm.

The processor may be further configured to execute the non-transitory computer executable instructions to cause the processor to: prior to receiving the LIDAR data, cause a display device to display instructions to a user on how to install the LIDAR camera. The processor may further be configured to execute the non-transitory computer executable instructions to cause the processor to provide an offer to discount an insurance policy if the user agrees to set up the LIDAR camera in a house of the user.

The electronic first notice of loss generated may be provided to an insurance provider's and/or an insured's computing device. For instance, an electronic first notice of loss may be transmitted to an insurance provider server or an insured's mobile device, and then displayed for review and further action, such as completing, preparing, processing, or handling an insurance claim.

Exemplary Assistance to an Impaired Individual Functionality

In another aspect, a computer-implemented method for assisting a human individual may be provided. The method may include, via one or more local or remote processors, transceivers, sensors, and/or servers: (1) receiving LIDAR data generated from a LIDAR camera; and/or (2) generating and providing navigation feedback to the human individual based upon the LIDAR data.

The navigation feedback may be auditory, and may include direction and distance instructions to guide the human individual. The navigation feedback may further be delivered to the human individual through a smart speaker positioned in a home.

The method may further include receiving global positioning system (GPS) data of the human individual, and the provided navigation feedback may further be based upon the GPS data of the human individual. The LIDAR camera may be a first LIDAR camera, and the LIDAR data may be first LIDAR data. And, the method may further include receiving second LIDAR data generated from a second LIDAR camera. The second LIDAR camera may be configured to be stationed in a home, and the provided navigation feedback may further be based upon the second LIDAR data.

The method may further include receiving drone data, and the provided navigation feedback may further be based upon the drone data. The method may further include: based upon the LIDAR data, determining that the human individual is on course to enter a crosswalk; based upon the LIDAR data, determining that an object is approaching the crosswalk; and in response to both (i) the determination that the human individual is on the course to enter the crosswalk, and (ii) the determination that the object is approaching the crosswalk, providing feedback to the human individual instructing the human individual not to enter the crosswalk.

The method may further include: prior to gathering the LIDAR data, creating a layout of a home including at least one 3D point cloud map. The provided navigation feedback may be generated by combining the layout of the home with the LIDAR data. The method may include additional, less, or alternate functionality, including that discussed elsewhere herein.

In another aspect an electronic device for assisting a human individual may be provided. The electronic device may be configured to, via one or more processors, transceivers, and/or sensors: (1) receive LIDAR data generated from the LIDAR camera; and/or (2) generate and provide navigation feedback to the human individual based upon the LIDAR data.

The navigation feedback may be auditory, and may include direction and distance instructions to guide the human individual. The electronic device may be further configured to deliver the feedback to the human individual through a smart speaker positioned in a home.

The electronic device may be further configured to: receive global positioning system (GPS) data from a GPS device; and provide the navigation feedback further based upon the GPS data.

The LIDAR camera may be a first LIDAR camera, and the LIDAR data may be first LIDAR data. The electronic device may be further configured to: receive second LIDAR data generated from a second LIDAR camera. The second LIDAR camera may be configured to be stationed in a home. And, the electronic device may be further configured to provide the navigation feedback further based upon the second LIDAR data. The electronic device may include additional, less, or alternate functionality, including that discussed elsewhere herein.

In another aspect, a computer system for assisting a human individual may be provided. The system may include: (a) a LIDAR camera configured to be harnessed to a human individual, and (b) a memory configured to store non-transitory computer executable instructions and configured to interface with a processor. The processor may be configured to interface with the memory, and may be further configured to execute the non-transitory computer executable instructions to cause the processor and/or an associated transceiver to: (1) receive LIDAR data generated from the LIDAR camera; and/or (2) generate and provide navigation feedback to the human individual based upon the LIDAR data.

The navigation feedback may be auditory, and may include direction and distance instructions to guide the human individual. The system may further include a smart speaker configured to be positioned in a home. The processor may be further configured to execute the non-transitory computer executable instructions to cause the processor to deliver: (i) the navigation feedback as auditory feedback, and (ii) the navigation feedback through the smart speaker.

The system may further include a device configured to: (i) gather global positioning system (GPS) data, and (ii) be attached to the LIDAR camera. The provided navigation feedback may be further based upon the GPS data.

The LIDAR camera may be a first LIDAR camera, and the LIDAR data may be first LIDAR data. The system may further include a second LIDAR camera. The second LIDAR camera may be configured to be stationed in a home. The processor may be further configured to execute the non-transitory computer executable instructions to cause the processor to provide the navigation feedback to the human individual based further on the second LIDAR data.

The system may further include a drone configured to gather drone data. The processor may be further configured to execute the non-transitory computer executable instructions to cause the processor to provide the navigation feedback to the human individual based further on the drone data.

The processor may be further configured to execute the non-transitory computer executable instructions to cause the processor to: based upon the LIDAR data, determine if the human individual is on course to enter a crosswalk; based upon the LIDAR data, determine if an object is approaching the crosswalk; and if both (i) the human individual is on the course to enter the crosswalk, and (ii) the object is approaching the crosswalk, provide feedback to the human individual instructing the human individual not to enter the crosswalk. The computer system may include additional, less, or alternate functionality, including that discussed elsewhere herein.

Generating Personal Articles Insurance Quote

In one aspect, a computer-implemented method for generating a personal articles insurance quote may be provided. The method may include, via one or more processors, transceivers, sensors, and/or servers: (1) receiving light detection and ranging (LIDAR) data generated from one or more LIDAR cameras; (2) analyzing the LIDAR data to determine or identify one or more personal articles or insurable assets; and/or (3) generating an electronic personal articles insurance quote based upon the one or more personal articles or insurable assets determined or identified from the LIDAR data. The method may include additional, less, or alternate functionality, including that discussed elsewhere herein.

For instance, the method may include, via the one or more processors, transceivers, sensors, and/or servers, transmitting the electronic personal articles insurance quote to a mobile device of a customer via wireless communication and/or data transmission over one or more radio frequency links for the customer's review, modification, and/or approval.

The method may also include, via the one or more processors, transceivers, sensors, and/or servers, generating an electronic inventory list of personal belongings including several personal articles identified from processor analysis of the LIDAR data, and transmitting the electronic inventory list to a mobile device of a customer via wireless communication and/or data transmission over one or more radio frequency links for customer review, modification, and/or approval.

The method may include, via the one or more processors, transceivers, sensors, and/or servers, generating an electronic inventory list of personal belongings including several personal articles identified from processor analysis of (i) the LIDAR data, and (ii) one or more additional sources of data, the one or more additional sources of data including at least one of mobile device data and/or images; smart home sensor data and/or images; drone sensor data and/or images; vehicle sensor data and/or images; and/or smart infrastructure data and/or images. The electronic inventory list may include one or more vehicles, and make and model thereof. Additionally or alternatively, the electronic inventory list may include one or more electronic devices, televisions, furniture, antiques, paintings, etc. The LIDAR data may be received via wireless communication or data transmission over one or more radio frequency links.

In another aspect, a computer system configured to generate an electronic personal articles insurance quote may be provided. The computer system may include one or more processors, transceivers, sensors, and/or servers configured to: (1) receive light detection and ranging (LIDAR) data generated from one or more LIDAR cameras; (2) analyze the LIDAR data to determine or identify one or more personal articles or insurable assets; (3) generate an electronic personal articles insurance quote based upon the one or more personal articles or insurable assets determined or identified from the LIDAR data; and/or (4) transmit the electronic personal articles insurance quote to a mobile device of a customer via wireless communication and/or data transmission over one or more radio frequency links for their review, modification, and/or approval.

The system may also be configured to, via the one or more processors, transceivers, sensors, and/or servers, (5) generate an electronic inventory list of personal belongings including several personal articles identified from processor analysis of (i) the LIDAR data, and (ii) one or more additional sources of data, the or more additional sources of data including at least one of: mobile device data and/or images; smart home sensor data and/or images; drone sensor data and/or images; vehicle sensor data and/or images; and/or smart infrastructure data and/or images, and (6) transmit the electronic inventory list to a mobile device of a customer via wireless communication and/or data transmission over one or more radio frequency links for their review, modification, and/or approval. The system may also be configured to, via the one or more processors, transceivers, sensors, and/or servers, receive the LIDAR data via wireless communication or data transmission over one or more radio frequency links. The system may include additional, less, or alternate functionality, including that discussed elsewhere herein.

In yet another aspect, a computer system for generating an electronic personal articles insurance quote may be provided. The computer system may include: one or more processors; and a program memory coupled to the one or more processors and storing executable instructions that when executed by the one or more processors cause the computer system to: (1) receive light detection and ranging (LIDAR) data generated from one or more LIDAR cameras; (2) analyze the LIDAR data to determine or identify one or more personal articles or insurable assets; and (3) generate an electronic personal articles insurance quote based upon the one or more personal articles or insurable assets determined or identified from the LIDAR data.

In the computer system, the executable instructions may further cause the computer system to transmit the electronic personal articles insurance quote to a mobile device of a customer via wireless communication and/or data transmission over one or more radio frequency links for customer review, modification, and/or approval. The executable instructions may further cause the computer system to generate an electronic inventory list of personal belongings including several personal articles identified from processor analysis of the LIDAR data.

The executable instructions may further cause the computer system to generate an electronic inventory list of personal belongings including several personal articles identified from processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and/or images.

Generating Inventory List of Personal Belongings

In one aspect, a computer-implemented method for generating an electronic inventory list of personal belongings may be provided. The method may include, via one or more processors, transceivers, sensors, and/or servers: (1) receiving light detection and ranging (LIDAR) data generated from one or more LIDAR cameras; (2) analyzing the LIDAR data to determine or identify one or more personal articles or insurable assets; (3) generating an electronic inventory list of personal belongings based upon the one or more personal articles or insurable assets determined or identified from the LIDAR data; and/or (4) transmitting the electronic inventory list to a mobile device of a customer via wireless communication and/or data transmission over one or more radio frequency links for customer review, modification, and/or approval. The method may include additional, less, or alternate functionality, including that discussed elsewhere herein.

For instance, the method may include, via the one or more processors, transceivers, sensors, and/or servers, generating an electronic personal articles insurance quote covering several personal articles identified from processor analysis of the LIDAR data and listed within the electronic inventory list, and/or transmitting the electronic personal articles insurance quote to a mobile device of a customer via wireless communication and/or data transmission over one or more radio frequency links for the customer's review, modification, and/or approval.

The method may include generating the electronic inventory list, via the one or more processors, transceivers, sensors, and/or servers, by processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and/or images. The electronic inventory list may include one or more vehicles, and make and model thereof. The electronic inventory list may include one or more electronic devices, televisions, furniture, antiques, paintings, jewelry, or other insurable belongings. The LIDAR data may be received via wireless communication or data transmission over one or more radio frequency links.

In another aspect, a computer system configured to generate an electronic inventory list of personal belongings may be provided. The computer system may include one or more processors, transceivers, sensors, and/or servers configured to: (1) receive light detection and ranging (LIDAR) data generated from one or more LIDAR cameras; (2) analyze the LIDAR data to determine or identify one or more personal articles or insurable assets; (3) generate an electronic inventory list of personal belongings based upon the one or more personal articles or insurable assets determined or identified from the LIDAR data; and/or (4) transmit the electronic inventory list to a mobile device of a customer via wireless communication and/or data transmission over one or more radio frequency links for customer review, modification, and/or approval. The computer system may include additional, less, or alternate functionality, including that discussed elsewhere herein.

For instance, the system may be further configured to, via the one or more processors, transceivers, sensors, and/or servers, generate an electronic personal articles insurance quote covering several personal articles identified from processor analysis of the LIDAR data and including personal articles listed in the electronic inventory list. The computer system may be further configured to, via the one or more processors, transceivers, sensors, and/or servers, transmit the electronic personal articles insurance quote to a mobile device of a customer via wireless communication and/or data transmission over one or more radio frequency links for customer review, modification, and/or approval.

In the computer system, the generation of the electronic inventory list may include, via the one or more processors, transceivers, sensors, and/or servers, processor analysis of (i) the LIDAR data, and (ii) one or more additional sources of data, the additional sources of data including at least one of: mobile device data and/or images; smart home sensor data and/or images; drone sensor data and/or images; vehicle sensor data and/or images; and/or smart infrastructure data and/or images.

In the computer system, the electronic inventory list may include one or more vehicles, and make and model thereof. The electronic inventory list may include one or more electronic devices, televisions, furniture, antiques, and/or paintings. The computer system may be further configured to, via the one or more processors, transceivers, sensors, and/or servers, receive the LIDAR data via wireless communication or data transmission over one or more radio frequency links.

In yet another aspect, a computer system for generating an electronic personal articles insurance quote may be provided. The computer system may include: one or more processors; and a program memory coupled to the one or more processors and storing executable instructions that when executed by the one or more processors cause the computer system to: (1) receive light detection and ranging (LIDAR) data generated from one or more LIDAR cameras; (2) analyze the LIDAR data to determine or identify one or more personal articles or insurable assets; and (3) generate an electronic inventory list of personal belongings based upon the one or more personal articles or insurable assets determined or identified from the LIDAR data. The system may include additional, less, or alternate functionality, including that discussed elsewhere herein.

In the computer system, the executable instructions may further cause the computer system to transmit the electronic inventory list to a mobile device of a customer via wireless communication and/or data transmission over one or more radio frequency links for customer review, modification, and/or approval. The executable instructions may further cause the computer system to generate an electronic personal articles insurance quote covering several personal articles identified from processor analysis of the LIDAR data and including personal articles listed in the electronic inventory list. The executable instructions may further cause the computer system to transmit the electronic personal articles insurance quote to a mobile device of a customer via wireless communication and/or data transmission over one or more radio frequency links for customer review, modification, and/or approval.

Generating Homeowners Insurance Quote

In one aspect, a computer-implemented method of generating an electronic homeowners insurance quote may be provided. The method may include, via one or more processors, transceivers, sensors, and/or servers: (1) receiving light detection and ranging (LIDAR) data generated from one or more LIDAR cameras; (2) analyzing the LIDAR data to determine or identify one or more features or characteristics of a home; (3) generating an electronic homeowners insurance quote based upon, at least in part, the one or more features or characteristics of the home determined or identified from the LIDAR data; and/or (4) transmitting the electronic homeowners insurance quote to a mobile device of a customer via wireless communication and/or data transmission over one or more radio frequency links for the customer's review, modification, and/or approval. The method may include additional, less, or alternate actions, including those discussed elsewhere herein.

The method may include, via the one or more processors, transceivers, sensors, and/or servers, generating an electronic inventory of home features or characteristics including several features or characteristics identified from processor analysis of the LIDAR data. Additionally or alternatively, the method may include, via the one or more processors, transceivers, sensors, and/or servers, generating an electronic inventory of home features or characteristics including several features or characteristics identified from processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and images.

The one or more features or characteristics of the home determined or identified from the LIDAR data may include: (1) type of flooring, carpet, or tile; (2) type of fixtures; (3) type of cabinets; (4) number and size of bedrooms; (5) number and size of bathrooms; (6) size of garage; (7) type of siding; (8) type of roofing materials; (9) type of windows; and/or (10) number and size of rooms.

The LIDAR data may be received via wireless communication or data transmission over one or more radio frequency links.

In another aspect, a computer system configured to generate a homeowners insurance quote may be provided. The system may include one or more processors, transceivers, sensors, and/or servers configured to: (1) receive light detection and ranging (LIDAR) data generated from one or more LIDAR cameras, such as via wireless communication or data transmission over one or more radio frequency links; (2) analyze the LIDAR data to determine or identify one or more features or characteristics of a home; (3) generate an electronic homeowners insurance quote based upon, at least in part, the one or more features or characteristics of the home determined or identified from the LIDAR data; and/or (4) transmit the electronic homeowners or renters insurance quote to a mobile device of a customer via wireless communication and/or data transmission over one or more radio frequency links for customer review, modification, and/or approval. The computer system may include additional, less, or alternate functionality, including that discussed elsewhere herein.

For instance, the computer system may be configured to, via the one or more processors, transceivers, sensors, and/or servers, generate an inventory of home features or characteristics including several features or characteristics identified from processor analysis of (i) the LIDAR data, and (ii) one or more additional sources of data, the additional sources of data including at least one of: mobile device data and/or images; smart home sensor data and/or images; drone sensor data and/or images; vehicle sensor data and/or images; and/or smart infrastructure data and images.

The one or more features or characteristics of the home determined or identified from the LIDAR data may include: (1) type of flooring, carpet, or tile; (2) type of fixtures; (3) type of cabinets; (4) number and size of bedrooms; (5) number and size of bathrooms; (6) size of garage; (7) type of siding; (8) type of roofing materials; and/or (9) type of windows.

The one or more features or characteristics of the home determined or identified from the LIDAR data may include number and size of rooms. The LIDAR data may be received via wireless communication or data transmission over one or more radio frequency links.

In yet another aspect, a computer system configured to generate a homeowners insurance quote may be provided. The computer system may include: one or more processors; and a program memory coupled to the one or more processors and storing executable instructions that when executed by the one or more processors cause the computer system to: (1) receive light detection and ranging (LIDAR) data generated from one or more LIDAR cameras; (2) analyze the LIDAR data to determine or identify one or more features or characteristics of a home; and (3) generate an electronic homeowners insurance quote based upon, at least in part, the one or more features or characteristics of the home determined or identified from the LIDAR data. The computer system may include additional, less, or alternate functionality, including that discussed elsewhere herein.

For instance, the executable instructions may further cause the computer system to transmit the electronic homeowners or renters insurance quote to a mobile device of a customer via wireless communication and/or data transmission over one or more radio frequency links for customer review, modification, and/or approval. The executable instructions may further cause the computer system to generate an electronic inventory of home features or characteristics including several features or characteristics identified from processor analysis of the LIDAR data.

The executable instructions may further cause the computer system to generate an inventory of home features or characteristics including several features or characteristics identified from processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and images.

The one or more features or characteristics of the home determined or identified from the LIDAR data may include: (1) type of flooring, carpet, or tile; (2) type of fixtures; (3) type of cabinets; (4) number and size of bedrooms; (5) number and size of bathrooms; (6) size of garage; (7) type of siding; (8) type of roofing materials; and (9) type of windows.

The one or more features or characteristics of the home determined or identified from the LIDAR data may include number and size of rooms.

Generating Claim for Customer Review from Lidar Data

In one aspect, a computer-implemented method for generating an electronic insurance claim may be provided. The method may include, via one or more processors, transceivers, sensors, and/or servers: (1) receiving light detection and ranging (LIDAR) data generated from one or more LIDAR cameras; (2) analyzing the LIDAR data to determine or identify damage to one or more insured assets; (3) generating an electronic insurance claim based upon the damage to the one or more insured assets determined or identified from the LIDAR data; and/or (4) transmitting the electronic insurance claim to a mobile device of a customer via wireless communication and/or data transmission over one or more radio frequency links for the customer's review, modification, and/or approval. The method may include additional, less, or alternate actions, including those discussed elsewhere herein.

For instance, the one or more insured assets may be a home, and the damage identified from processor analysis of the LIDAR data may be home damage or damage to one or more home features or characteristics. Additionally or alternatively, the one or more insured assets may include one or more personal articles, and the damage identified from processor analysis of the LIDAR data may be home damage or damage to the one or more personal articles.

The method may include, via the one or more processors, transceivers, sensors, and/or servers, generating an electronic inventory list of personal belongings including several personal articles identified from processor analysis of the LIDAR data, and transmitting the electronic inventory list to a mobile device of a customer via wireless communication and/or data transmission over one or more radio frequency links for customer review, modification, and/or approval.

The method may include, via the one or more processors, transceivers, sensors, and/or servers, determining or identifying damage to one or more insured assets from processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and/or images.

The method may include, via the one or more processors, transceivers, sensors, and/or servers, estimating repair or replacement cost of one or more insured assets from processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and/or images.

The LIDAR data may be received via wireless communication or data transmission over one or more radio frequency links.

In another aspect, a computer system configured to generate an electronic insurance claim may be provided. The system may include one or more processors, transceivers, sensors, and/or servers configured to: (1) receive light detection and ranging (LIDAR) data generated from one or more LIDAR cameras; (2) analyze the LIDAR data to determine or identify damage to one or more insured assets; (3) generate an electronic insurance claim based upon the damage to the one or more insured assets determined or identified from the LIDAR data; and/or (4) transmit the electronic insurance claim to a mobile device of a customer via wireless communication and/or data transmission over one or more radio frequency links for the customer's review, modification, and/or approval. The computer system may include additional, less, or alternate functionality, including that discussed elsewhere herein.

For instance, the system may further be configured to, via the one or more processors, transceivers, sensors, and/or servers, transmit the electronic insurance claim to a mobile device of a customer via wireless communication and/or data transmission over one or more radio frequency links for the customer's review, modification, and/or approval.

The one or more insured assets may be a home, and the damage identified from processor analysis of the LIDAR data may be home damage or damage to one or more home features or characteristics. The one or more insured assets may include one or more personal articles, and the damage identified from processor analysis of the LIDAR data may be home damage or damage to the one or more personal articles.

The computer system may further be configured to, via the one or more processors, transceivers, sensors, and/or servers, generate an electronic inventory list of personal belongings including several personal articles identified from processor analysis of the LIDAR data. The computer system may further be configured to, via the one or more processors, transceivers, sensors, and/or servers, transmit the electronic inventory list to a mobile device of a customer via wireless communication and/or data transmission over one or more radio frequency links for customer review, modification, and/or approval.

The system may be configured to, via the one or more processors, transceivers, sensors, and/or servers, determine or identify damage to one or more insured assets from processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and/or images. Additionally or alternatively, the system may be configured to, via the one or more processors, transceivers, sensors, and/or servers, estimate repair or replacement cost of one or more insured assets from processor analysis of (i) the LIDAR data, and (ii) one or more additional sources of data, the one or more additional sources of data including at least one of: mobile device data and/or images; smart home sensor data and/or images; drone sensor data and/or images; vehicle sensor data and/or images; and/or smart infrastructure data and/or images.

The system may further be configured to, via the one or more processors, transceivers, sensors, and/or servers, receive the LIDAR data via wireless communication or data transmission over one or more radio frequency links.

In yet another aspect, a computer system for generating an electronic insurance claim may be provided. The system may include: one or more processors; and a program memory coupled to the one or more processors and storing executable instructions that when executed by the one or more processors cause the computer system to: (1) receive light detection and ranging (LIDAR) data generated from one or more LIDAR cameras; (2) analyze the LIDAR data to determine or identify damage to one or more insured assets; and (3) generate an electronic insurance claim based upon the damage to the one or more insured assets determined or identified from the LIDAR data. The computer system may include additional, less, or alternate functionality, including that discussed elsewhere herein.

For instance, the executable instructions may further cause the computer system to transmit the electronic insurance claim to a mobile device of a customer via wireless communication and/or data transmission over one or more radio frequency links for the customer's review, modification, and/or approval.

First Notice of Loss

In one aspect, a computer-implemented method for providing first notice of loss may be provided. The method may include, via one or more processors, transceivers, sensors, and/or servers: (1) receiving light detection and ranging (LIDAR) data generated from a LIDAR camera; (2) determining that an insurance-related event has occurred based upon processor analysis of the received LIDAR data; (3) in response to the determination that the insurance-related event has occurred, generating an electronic first notice of loss; and/or (4) transmitting the electronic first notice of loss to one or more local or remote computing devices, such as an insured's mobile device, or otherwise displaying the electronic first notice of loss on one or more local or remote computing device display screens. The method may include additional, less, or alternate actions, including those discussed elsewhere herein.

For instance, the method may include, via the one or more processors, transceivers, sensors, and/or servers, receiving or retrieving one or more additional sources of data, and analyzing the received LIDAR and the one or more additional sources data to determine that the insurance-related event has occurred. The one or more additional sources of data may include: mobile device data and/or images; smart home sensor data and/or images; drone sensor data and/or images; vehicle sensor data and/or images; and/or smart infrastructure data and/or images.

The method may include, via the one or more processors, transceivers, sensors, and/or servers, receiving or retrieving one or more additional sources of data, and analyzing the received LIDAR and the one or more additional sources data to identify one or more insured assets that are damaged. Additionally or alternatively, the method may include, via the one or more processors, transceivers, sensors, and/or servers, receiving or retrieving one or more additional sources of data, and analyzing the received LIDAR and the one or more additional sources data to estimate an amount of damage to the identified one or more insured assets, and/or to estimate a repair or replacement cost of the identified one or more insured assets. The identified one or more insured assets may include a home, vehicles, and/or personal articles.

The LIDAR data may be received via wireless communication or data transmission over one or more radio frequency links.

In another aspect, a computer system configured to provide first notice of loss may be provided. The method may include, via one or more processors, transceivers, sensors, and/or servers: (1) receive light detection and ranging (LIDAR) data generated from a LIDAR camera, such as via wireless communication or data transmission over one or more radio frequency links; (2) determine that an insurance-related event has occurred based upon processor analysis of the received LIDAR data; (3) in response to the determination that the insurance-related event has occurred, generate an electronic first notice of loss; and/or (4) display the electronic first notice of loss on one or more local or remote display screens of computing devices, and/or transmit the electronic first notice of loss to one or more local or remote computing devices, such as an insured's mobile device, for display. The system may include additional, less, or alternate functionality, including that discussed elsewhere herein.

For instance, the system may be configured to, via the one or more processors, transceivers, sensors, and/or servers, receive or retrieve one or more additional sources of data, and analyzing the received LIDAR and the one or more additional sources data to determine that the insurance-related event has occurred. The one or more additional sources of data include: mobile device data and/or images; smart home sensor data and/or images; drone sensor data and/or images; vehicle sensor data and/or images; and/or smart infrastructure data and/or images.

The system may be configured to, via the one or more processors, transceivers, sensors, and/or servers, receive or retrieve one or more additional sources of data, and analyzing the received LIDAR and the one or more additional sources data to identify one or more insured assets that are damaged, and/or to estimate an amount of damage to the identified one or more insured assets or estimate a repair or replacement cost of the identified one or more insured assets.

The identified one or more insured assets may include a home, vehicles, and/or personal articles. The one or more processors, transceivers, sensors, and/or servers, may be configured to receive the LIDAR data via wireless communication or data transmission over one or more radio frequency links.

In yet another aspect, a computer system configured to provide first notice of loss may be provided. The computer system may include: one or more processors; and a program memory coupled to the one or more processors and storing executable instructions that when executed by the one or more processors cause the computer system to: (1) receive light detection and ranging (LIDAR) data generated from a LIDAR camera; (2) determine if an insurance-related event has occurred based upon processor analysis of the received LIDAR data; and (3) if the insurance-related event has occurred, generate an electronic first notice of loss. The system may include additional, less, or alternate functionality, including that discussed elsewhere herein.

For instance, the executable instructions may further cause the computer system to receive or retrieve one or more additional sources of data, and analyzing the received LIDAR and the one or more additional sources data to determine that the insurance-related event has occurred.

Navigation for Vision-Impaired

In one aspect, a computer-implemented method for assisting a human individual or for providing navigation assistance for vision-impaired individuals may be provided. The method may include, via one or more processors, sensors, servers, and/or transceivers: (1) receiving light detection and ranging (LIDAR) data generated from a LIDAR camera; (2) detecting, within the LIDAR data: (i) the human individual, (ii) a first location of the human individual, (iii) one or more obstacles, and (iv) a second location of the one or more obstacles; and/or (3) providing navigation feedback to the human individual based upon the LIDAR data, the first location of the individual, and/or the second location of the one or more obstacles as determined from the LIDAR data to facilitate providing navigation assistance to vision-impaired individuals. The navigation feedback may be auditory or visual, and may include direction and distance instructions to guide the individual and avoid the one or more obstacles. The method may include additional, less, or alternate actions, including that discussed elsewhere herein.

For instance, the method may include, via the one or more processors, sensors, servers, and/or transceivers: (1) receiving the LIDAR data at a smart home controller; (2) receiving, at the smart home controller, smart home sensor data including image data; (3) analyzing the LIDAR data and/or the smart home sensor data to detect the individual or the first location of the individual within or about a home; (4) analyzing the LIDAR data and/or the smart home sensor data to detect a direction of movement of the individual within or about the home; (5) analyzing the LIDAR data and/or the smart home sensor data to detect (i) the one or more obstacles in front of the direction of movement of the individual within or about the home, and/or (ii) the second location of the one or more obstacles in front of the direction of movement of the individual within or about the home; and (6) generating and providing navigation feedback to the individual to avoid the one or more obstacles and/or move about the home based upon (i) the first location of the individual, (ii) the direction of movement of the individual, and/or (iii) the second location of the one or more obstacles in front of the direction of movement of the individual.

The method may include, via the one or more processors, sensors, servers, and/or transceivers: receiving the LIDAR data at a smart home controller; receiving, at the smart controller, smart home sensor data including image data; and analyzing the LIDAR data and/or the smart home sensor data to generate a virtual map of obstacles within a home.

The method may include, via the one or more processors, sensors, servers, and/or transceivers: receiving the LIDAR data at a mobile device of the individual; and generating the navigation feedback via the mobile device.

The method may include, via the one or more processors, sensors, servers, and/or transceivers: (1) receiving the LIDAR data at a smart infrastructure controller; (2) receiving, at the smart infrastructure controller, smart infrastructure sensor data (including image data) at the smart infrastructure controller; (3) analyzing the LIDAR data and/or the smart infrastructure sensor data to detect the individual or the first location of the individual; (4) analyzing the LIDAR data and/or the smart infrastructure sensor data to detect a direction of movement of the individual; (5) analyzing the LIDAR data and/or the smart infrastructure sensor data to detect (i) the one or more obstacles in front of the direction of movement of the individual, and/or (ii) the second location of the one or more obstacles in front of the direction of movement of the individual; and/or (6) providing navigation feedback to the individual to avoid the one or more obstacles and/or move about based upon (i) the first location of the individual, (ii) the direction of movement of the individual, and/or (iii) the second location of the one or more obstacles in front of the direction of movement of the individual.

The LIDAR data may be received via wireless communication or data transmission over one or more radio frequency links.

In another aspect, a computer system configured to assist a human individual or provide navigation assistance for vision-impaired individuals may be provided. The computer system may include one or more processors, sensors, servers, and/or transceivers configured to: (1) receive light detection and ranging (LIDAR) data generated from a LIDAR camera; (2) detect, within the LIDAR data: (i) the human individual, (ii) a first location of the human individual, (iii) one or more obstacles, and (iv) a second location of the one or more obstacles; and (3) provide navigation feedback to the human individual based upon the LIDAR data, the first location of the individual, and/or the second location of the one or more obstacles as determined from the LIDAR data to facilitate providing navigation assistance to the human individual. The navigation feedback may be visual or auditory, and may include direction and distance instructions to guide the individual and avoid the one or more obstacles. The computer system may include additional, less, or alternate functionality, including that discussed elsewhere herein.

For instance, the computer system may include, via the one or more processors, sensors, servers, and/or transceivers, to: (a) receive the LIDAR data at a smart home controller receive, at the smart home controller, smart home sensor data including image data; (b) receive, at the smart home controller, smart home sensor data including image data; (c) analyze the LIDAR data and/or the smart home sensor data to detect the individual or the first location of the individual within or about a home; (d) analyze the LIDAR data and/or the smart home sensor data to detect a direction of movement of the individual within or about the home; (e) analyze the LIDAR data and/or the smart home sensor data to detect (i) the one or more obstacles in front of the direction of movement of the individual within or about the home, and/or (ii) the second location of the one or more obstacles in front of the direction of movement of the individual within or about the home; and (f) generate and provide navigation feedback to the individual to avoid the one or more obstacles and/or move about the home based upon (i) the first location of the individual, (ii) the direction of movement of the individual, and/or (iii) the second location of the one or more obstacles in front of the direction of movement of the individual.

The computer system may be further configured to, via the one or more processors, sensors, servers, and/or transceivers: receive the LIDAR data at a smart home controller; receive, at the smart controller, smart home sensor data including image data; and analyze the LIDAR data and/or the smart home sensor data to generate a virtual map of obstacles within a home.

The computer system may be further configured to, via the one or more processors, sensors, servers, and/or transceivers, to: receive the LIDAR data at a mobile device of the individual; and/or generate the navigation feedback via the mobile device.

The computer system may be further configured to, via the one or more processors, sensors, servers, and/or transceivers, to: receive the LIDAR data at a smart infrastructure controller, such as via wireless communication or data transmission over one or more radio frequency links; receive smart infrastructure sensor data (including image data) at the smart infrastructure controller; analyze the LIDAR data and/or the smart infrastructure sensor data to detect the individual or the first location of the individual; analyze the LIDAR data and/or the smart infrastructure sensor data to detect a direction of movement of the individual; analyze the LIDAR data and/or the smart infrastructure sensor data to detect (i) the one or more obstacles in front of the direction of movement of the individual, and/or (ii) the second location of the one or more obstacles in front of the direction of movement of the individual; generate or provide navigation feedback to the individual to avoid the one or more obstacles and/or move about based upon (i) the first location of the individual, (ii) the direction of movement of the individual, and/or (iii) the second location of the one or more obstacles in front of the direction of movement of the individual.

The one or more processors, transceivers, sensors, and/or servers, may be configured to receive the LIDAR data via wireless communication or data transmission over one or more radio frequency links.

In yet another aspect, a computer system configured to provide first notice of loss may be provided. The computer system may include: one or more processors; and a program memory coupled to the one or more processors and storing executable instructions that when executed by the one or more processors cause the computer system to: (1) receive light detection and ranging (LIDAR) data generated from a LIDAR camera; (2) detect, within the LIDAR data: (i) the human individual, (ii) a first location of the human individual, (iii) one or more obstacles, and (iv) a second location of the one or more obstacles; and (3) provide navigation feedback to the human individual based upon the LIDAR data, the first location of the individual, and/or the second location of the one or more obstacles as determined from the LIDAR data to facilitate providing navigation assistance to the human individual. The system may include additional, less, or alternate functionality, including that discussed elsewhere herein.

For instance, the navigation feedback may be auditory, and comprise direction and distance instructions to guide the individual and avoid the one or more obstacles.

The computer system may be further configured, via the one or more processors, sensors, servers, and/or transceivers, to: (1) receive the LIDAR data at a smart home controller, such as via wireless communication or data transmission over one or more radio frequency links; (2) receive, at the smart home controller, smart home sensor data including image data; (3) analyze the LIDAR data and/or the smart home sensor data to detect the individual or the first location of the individual within or about a home; (4) analyze the LIDAR data and/or the smart home sensor data to detect a direction of movement of the individual within or about the home; (5) analyze the LIDAR data and/or the smart home sensor data to detect (i) the one or more obstacles in front of the direction of movement of the individual within or about the home, and/or (ii) the second location of the one or more obstacles in front of the direction of movement of the individual within or about the home; and (6) generate and provide navigation feedback to the individual to avoid the one or more obstacles and/or move about the home based upon (i) the first location of the individual, (ii) the direction of movement of the individual, and/or (iii) the second location of the one or more obstacles in front of the direction of movement of the individual. The navigation feedback may be auditory, and comprise direction and distance instructions to guide the individual and avoid the one or more obstacles.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for generating a personal articles insurance quote, comprising, via one or more processors, transceivers, sensors, and/or servers:
    causing a display device to display instructions to a customer on how to install one or more light detection and ranging (LIDAR) cameras;
    subsequent to the customer installing the one or more LIDAR cameras according to the displayed instructions, providing an insurance discount to the customer;
    generating LIDAR data with the one or more LIDAR cameras;
    receiving the LIDAR data generated from one or more LIDAR cameras;
    analyzing the LIDAR data to determine or identify one or more personal articles or insurable assets;
    generating an electronic inventory list of personal belongings including several personal articles identified from processor analysis of (i) the LIDAR data, and (ii) one or more additional sources of data including at least one of: mobile device data and/or images, smart home sensor data and/or images, drone sensor data and/or images, vehicle sensor data and/or images, or smart infrastructure data and/or images; and
    generating an electronic personal articles insurance quote based upon the one or more personal articles or insurable assets determined or identified from the LIDAR data.

2. The computer-implemented method of claim 1, the method further comprising, via the one or more processors, transceivers, sensors, and/or servers, transmitting the electronic personal articles insurance quote to a mobile device of the customer via wireless communication and/or data transmission over one or more radio frequency links for customer review, modification, and/or approval.

3. The computer-implemented method of claim 1, wherein the one or more LIDAR cameras are positioned within a home of the customer.

4. The computer-implemented method of claim 1, the method further comprising, via the one or more processors, transceivers, sensors, and/or servers, transmitting the electronic inventory list to a mobile device of the customer via wireless communication and/or data transmission over one or more radio frequency links for customer review, modification, and/or approval.

5. The computer-implemented method of claim 1, the one or more additional sources of data including all of: the mobile device data and/or images; the smart home sensor data and/or images; the drone sensor data and/or images; the vehicle sensor data and/or images; and the smart infrastructure data and/or images.

6. The computer-implemented method of claim 1, wherein the electronic inventory list includes one or more vehicles, and make and model thereof.

7. The computer-implemented method of claim 1, wherein the electronic inventory list includes one or more televisions, furniture, and/or paintings.

8. The computer-implemented method of claim 1, wherein the LIDAR data is received via wireless communication or data transmission over one or more radio frequency links.

9. A computer system configured to generate an electronic personal articles insurance quote, the system comprising one or more processors, transceivers, sensors, and/or servers configured to:
    cause a display device to display instructions to a customer on how to install one or more light detection and ranging (LIDAR) cameras;
    subsequent to the customer installing the one or more LIDAR cameras according to the displayed instructions, provide an insurance discount to the customer;
    generate LIDAR data with the one or more LIDAR cameras;
    receive the LIDAR data generated from one or more LIDAR cameras;
    analyze the LIDAR data to determine or identify one or more personal articles or insurable assets;
    generate an electronic inventory list of personal belongings including several personal articles identified from processor analysis of (i) the LIDAR data, and (ii) one or more additional sources of data including at least one of: mobile device data and/or images, smart home sensor data and/or images, drone sensor data and/or images, vehicle sensor data and/or images, or smart infrastructure data and/or images; and
    generate an electronic personal articles insurance quote based upon the one or more personal articles or insurable assets determined or identified from the LIDAR data.

10. The computer system of claim 9, the system further configured to, via the one or more processors, transceivers, sensors, and/or servers, transmit the electronic personal articles insurance quote to a mobile device of the customer via wireless communication and/or data transmission over one or more radio frequency links for customer review, modification, and/or approval.

11. The computer system of claim 9, wherein the instructions comprise instructions to the customer on how to install the one or more LIDAR cameras in a home.

12. The computer system of claim 9, the one or more additional sources of data including all of: the mobile device data and/or images; the smart home sensor data and/or images; the drone sensor data and/or images; the vehicle sensor data and/or images; and the smart infrastructure data and/or images.

13. The computer system of claim 9, wherein the electronic inventory list includes one or more vehicles, and make and model thereof.

14. The computer system of claim 9, wherein the electronic inventory list includes one or more electronic devices, televisions, furniture, antiques, and/or paintings.

15. The computer system of claim 9, the system further configured to, via the one or more processors, transceivers, sensors, and/or servers, transmit the electronic inventory list to a mobile device of the customer via wireless communication and/or data transmission over one or more radio frequency links for their review, modification, and/or approval.

16. The computer system of claim 9, the system further configured to, via the one or more processors, transceivers, sensors, and/or servers, receive the LIDAR data via wireless communication or data transmission over one or more radio frequency links.

17. A computer system for generating an electronic personal articles insurance quote, comprising:
   one or more processors; and
   a program memory coupled to the one or more processors and storing executable instructions that when executed by the one or more processors cause the computer system to:
   cause a display device to display instructions to a customer on how to install one or more light detection and ranging (LIDAR) cameras;
   subsequent to the customer installing the one or more LIDAR cameras according to the displayed instructions, provide an insurance discount to the customer;
   generate LIDAR data with the one or more LIDAR cameras;
   receive the LIDAR data generated from one or more LIDAR cameras;
   analyze the LIDAR data to determine or identify one or more personal articles or insurable assets;
   generate an electronic inventory list of personal belongings including several personal articles identified from processor analysis of (i) the LIDAR data, and (ii) one or more additional sources of data including at least one of: mobile device data and/or images, smart home sensor data and/or images, drone sensor data and/or images, vehicle sensor data and/or images, or smart infrastructure data and/or images; and
   generate an electronic personal articles insurance quote based upon the one or more personal articles or insurable assets determined or identified from the LIDAR data.

18. The computer system of claim 17, wherein the executable instructions further cause the computer system to transmit the electronic personal articles insurance quote to a mobile device of the customer via wireless communication and/or data transmission over one or more radio frequency links for customer review, modification, and/or approval.

19. The computer system of claim 17, wherein the one or more LIDAR cameras are positioned within a home of the customer.

20. The computer system of claim 17, the one or more additional sources of data including all of: the mobile device data and/or images; the smart home sensor data and/or images; the drone sensor data and/or images; the vehicle sensor data and/or images; and/or the smart infrastructure data and/or images.

* * * * *

UNITED STATES PATENT AND TRADEMARK OFFICE
CERTIFICATE OF CORRECTION

| | | |
|---|---|---|
| PATENT NO. | : 11,989,788 B2 | Page 1 of 1 |
| APPLICATION NO. | : 18/142641 | |
| DATED | : May 21, 2024 | |
| INVENTOR(S) | : Nicholas Carmelo Marotta et al. | |

It is certified that error appears in the above-identified patent and that said Letters Patent is hereby corrected as shown below:

On the Title Page

At item (72), Line 2, "Jd Johnson Willingham," should be -- JD Johnson Willingham, --.

Signed and Sealed this
Tenth Day of February, 2026

John A. Squires
*Director of the United States Patent and Trademark Office*